(12) United States Patent
Collins et al.

(10) Patent No.: US 7,548,929 B2
(45) Date of Patent: Jun. 16, 2009

(54) SYSTEM AND METHOD FOR DETERMINING SEMANTICALLY RELATED TERMS

(75) Inventors: Robert J. Collins, Carlsbad, CA (US); Graham Harris, Altadena, CA (US); Jesse Harris, Van Nuys, CA (US); Grant Kushida, Los Angeles, CA (US); Lance Riedel, Altadena, CA (US); Mohammad Sabah, North Hollywood, CA (US); Shaji Sebastian, Pasadena, CA (US); Jeff Yuan, Pasadena, CA (US); Yiping Zhou, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 421 days.

(21) Appl. No.: 11/432,266

(22) Filed: May 11, 2006

(65) Prior Publication Data

US 2007/0027864 A1 Feb. 1, 2007

Related U.S. Application Data

(60) Provisional application No. 60/703,904, filed on Jul. 29, 2005.

(51) Int. Cl.
G06F 17/30 (2006.01)
(52) U.S. Cl. ...................................... 707/101
(58) Field of Classification Search ............... 707/1–10, 707/100–103; 705/14, 24; 725/112
See application file for complete search history.

(56) References Cited

U.S. PATENT DOCUMENTS

| 5,920,859 | A | 7/1999 | Li |
| 6,216,123 | B1 | 4/2001 | Robertson et al. |
| 6,347,313 | B1 | 2/2002 | Ma et al. |
| 6,578,022 | B1 | 6/2003 | Foulger |
| 6,675,159 | B1 | 1/2004 | Lin et al. |
| 6,981,040 | B1 | 12/2005 | Konig et al. |

(Continued)

FOREIGN PATENT DOCUMENTS

EP 1587010 A2 10/2005

(Continued)

OTHER PUBLICATIONS

International Search Report for PCT/US2007/006764, dated Aug. 28, 2007, 2 pgs.

(Continued)

*Primary Examiner*—Diane Mizrahi
(74) *Attorney, Agent, or Firm*—Brinks Hofer Gilson & Lione

(57) ABSTRACT

The present disclosure is directed to systems and methods for determining semantically related terms. Generally, one or more seed terms are received from a user. A system searches a first index comprising a plurality of terms and one or more webpages associated with each term of the plurality of terms to determine a plurality of webpages associated with the seed terms. The system then searches a second index comprising a plurality of webpages and one or more terms associated with each webpage of the plurality of webpages to determine a plurality of potential terms associated with the plurality of webpages associated with the seed terms. At least one term of the plurality of potential terms is suggested to a user.

23 Claims, 9 Drawing Sheets

U.S. PATENT DOCUMENTS

| | | | |
|---|---|---|---|
| 2003/0055816 A1* | 3/2003 | Paine et al. | 707/3 |
| 2003/0069877 A1 | 4/2003 | Grefenstette | |
| 2003/0126139 A1* | 7/2003 | Lee et al. | 707/100 |
| 2005/0015366 A1 | 1/2005 | Carrasco | |
| 2005/0187818 A1* | 8/2005 | Zito et al. | 705/14 |
| 2006/0010105 A1 | 1/2006 | Sarukkai et al. | |
| 2006/0064411 A1 | 3/2006 | Gross | |
| 2007/0027754 A1* | 2/2007 | Collins et al. | 705/14 |
| 2007/0027865 A1* | 2/2007 | Bartz et al. | 707/5 |
| 2008/0077570 A1* | 3/2008 | Tang et al. | 707/5 |

FOREIGN PATENT DOCUMENTS

| | | |
|---|---|---|
| JP | 09-245038 A | 9/1997 |
| WO | WO2005013151 | 2/2005 |

OTHER PUBLICATIONS

Hang Cui et al.; "*Probabilistic Query Expansion Using Query Logs*"; WWW 2002, May 7-11, 2002; Honolulu, Hawaii, USA; ACM 1-58113-449-5/02/0005; 9 pages.

Brian D. Davison et al.; "*Finding Relevant Website Queries*"; Department of Computer Sciences & Engineering, Lehigh University; WWW2003, May 20-24, 2003, Budapest, Hungary; 2 pages.

Deborah Fallows, PhD; Pew/Internet, Pew Internet & American Life Project; Search Engine Users, "*Internet searchers are confident, satisfied and trusting-but they area also unaware and naïve*".; Embargoed for publication until 4pm, Jan. 23, 2005.

Trevor Hastie, et al., "*The Elements of Statistical Learning*", Data Mining, Inference, and Prediction, Springer Series in Statistics. Springer-Verlag, New York, 2001. pp. 94-105.

"*Automatic Information Retrieval*", Sep. 1980 IEEE, pp. 41-56.

Ning Liu, "*Learning Similarity Measures in Non-orthogonal Space*", Department of Matematical Science, Tsinghua University, Beijing China, Nov. 8-13, 2004, pp. 334-341.

PCT - International Search Report for PCT/US2008/069478, International Filing Date Jul. 9, 2008 (3 pgs).

\* cited by examiner

SYSTEM AND METHOD FOR DETERMINING SEMANTICALLY RELATED TERMS

RELATED APPLICATIONS

The present patent document claims the benefit of the filing date under 35 U.S.C. §119(e) of Provisional U.S. Patent Application Ser. No. 60/703,904, filed Jul. 29, 2005, the entirety of which is hereby incorporated herein by reference.

BACKGROUND

When advertising using an online advertisement service provider such as Yahoo! Search Marketing or performing a search using an internet search engine such as Yahoo!, users often wish to determine semantically related words. Two words or phrases are semantically related if the words or phrases are related in meaning in a language or in logic. Obtaining semantically related words allows or phrases advertisers to broaden or focus their online advertisements to relevant potential customers and allows searchers to broaden or focus their internet searches in order to obtain more relevant search results. Thus, it is desirable to develop a system and method for reliably providing users with semantically related words.

DETAILED DESCRIPTION OF THE DRAWINGS

The present disclosure is directed to systems and methods for discovering semantically related terms. The present disclosure describes systems and methods for discovering semantically related terms based on advertisement data of an advertisement campaign management system and based on search logs of an internet search engine. Further, the present disclosure describes systems and methods for obtaining seed terms and semantically related terms based on website content.

Figure 1:
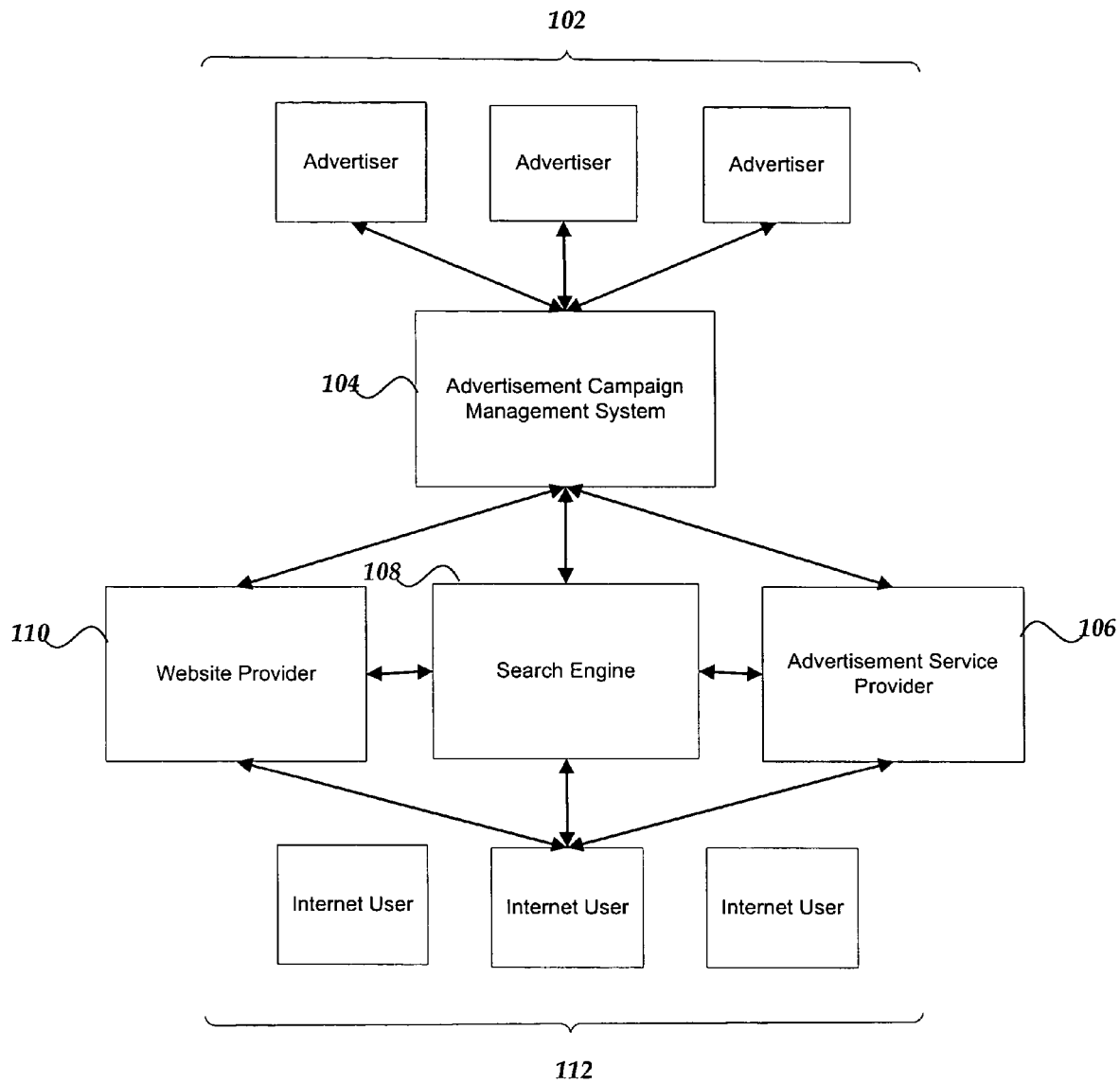
FIG. 1 is a block diagram of one embodiment of a system for the creation and dissemination of online advertisements.

FIG. 1 is a block diagram of one embodiment of a system for the creation and dissemination of online advertisements. The system 100 comprises a plurality of advertisers 102, an advertisement campaign management system 104, an advertisement service provider 106, a search engine 108, a website provider 110, and a plurality of Internet users 112. Generally, an advertiser 102 creates an advertisement by interacting with the advertisement campaign management system 104. The advertisement may be a banner advertisement that appears on a website viewed by Internet users 112, an advertisement that is served to an Internet user 108 in response to a search performed at a search engine, or any other type of online advertisement known in the art.

When an Internet user 112 performs a search at a search engine 106, or views a website served by the website provider 108, the advertisement service provider 106 serves one or more advertisements created using the advertisement campaign management system 104 to the Internet user 112 based on search terms or keywords provided by the internet user or obtained from a website. Additionally, the advertisement campaign management system 104 and advertisement service provider 106 typically record and process information associated with the served advertisement. For example, the advertisement campaign management system 104 and advertisement service provider 106 may record the search terms that caused the advertisement service provider 106 to serve the advertisement; whether the Internet user 112 clicked on a URL associated with the served advertisement; what additional advertisements the advertisement service provider 106 served with the advertisement; a rank or position of an advertisement when the Internet user 112 clicked on an advertisement; or whether an Internet user 112 clicked on a URL associated with a different advertisement. It will be appreciated that when an advertiser 102 later edits an advertisement, or creates a new advertisement, the advertiser 102 may wish to have the advertisement campaign management system 104 provide the advertiser 102 with suggested terms that would cause the advertisement service provider to serve the advertisement based on information associated with served advertisement or advertisements related to the served advertisement as collected by an advertisement service provider or an internet search engine.

Figure 2:
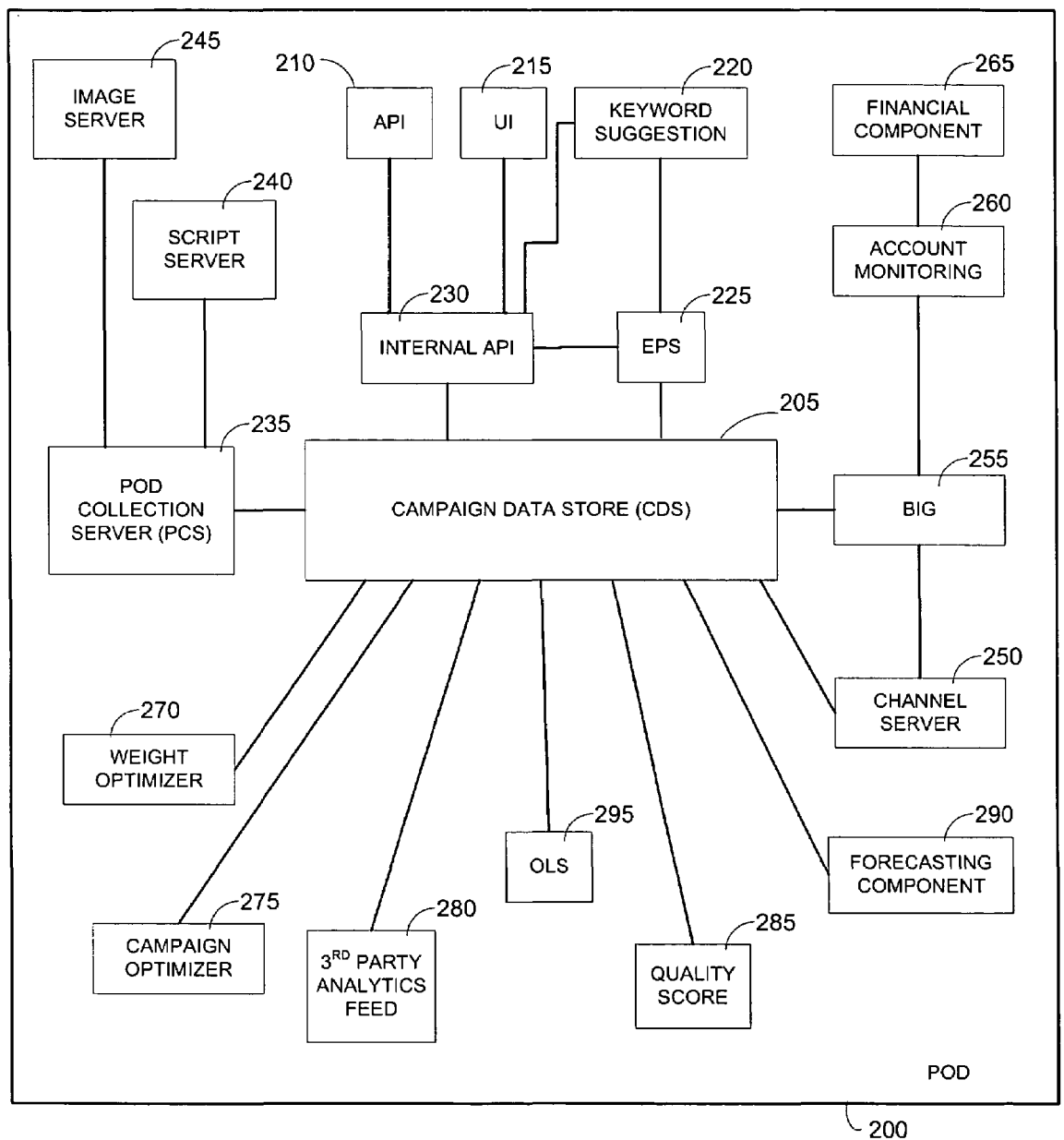
FIG. 2 illustrates one embodiment of a pod of an advertisement campaign management system.

FIG. 2 illustrates one embodiment of a pod of an advertisement ("ad") campaign management system. Pod 200 comprises a plurality of software components and data, that may be stored on a computer-readable storage medium, for facilitating the planning, management, optimization, delivery, communication, and implementation of advertisements and ad campaigns, as well as for storing and managing user accounts. In one embodiment, a pod 200 comprises a campaign data store ("CDS") 205 that stores user account information. Application Program Interfaces ("APIs") 210 and User Interfaces ("UI") 215 are used for reading data from and writing data to the campaign data store 205. Internal APIs 230 provide shared code and functions between the API and UI, as well as facilitate interface with the campaign data store 205. A keyword suggestion component 220 may assist users in searching for available search terms. An editorial processing system ("EPS") 225 may be provided to review content of all new ads. A pod collection server ("PCS") 235 determines which pod the collected ad campaign performance data should go to. A script server 240 provides scripts for collection of data indicative of the customer browsing sessions. An image server 245 receives and processes data indicative of the customer browsing sessions from the customer web browsers.

The pod may further comprise a channel server 250 operative to receive data from one or more advertising channels. A business information group ("BIG") 255 may provide analysis and filtering of raw click data coming from the advertising channels through the channel server 250. An account monitoring component 260 monitors budgets allocated for each ad campaign. A financial component 265 may be provided for planning and budgeting ad campaign expenses. A weight optimizer 270 operative to optimize individual ad performance. A campaign optimizer 275 may be provided to optimize performance of the ad campaign. A third-party analytical feed component 280 is provided to handle the incoming ad performance data from the third-party sources. A quality score component 285 provides yet another metric for measuring individual ad performance. A forecast component 290 is an analytical tool for predicting keywords trends. Finally, an online sign-up ("OLS") component 295 provides heightened security services for online transactions involving exchange of moneys.

Figure 3:
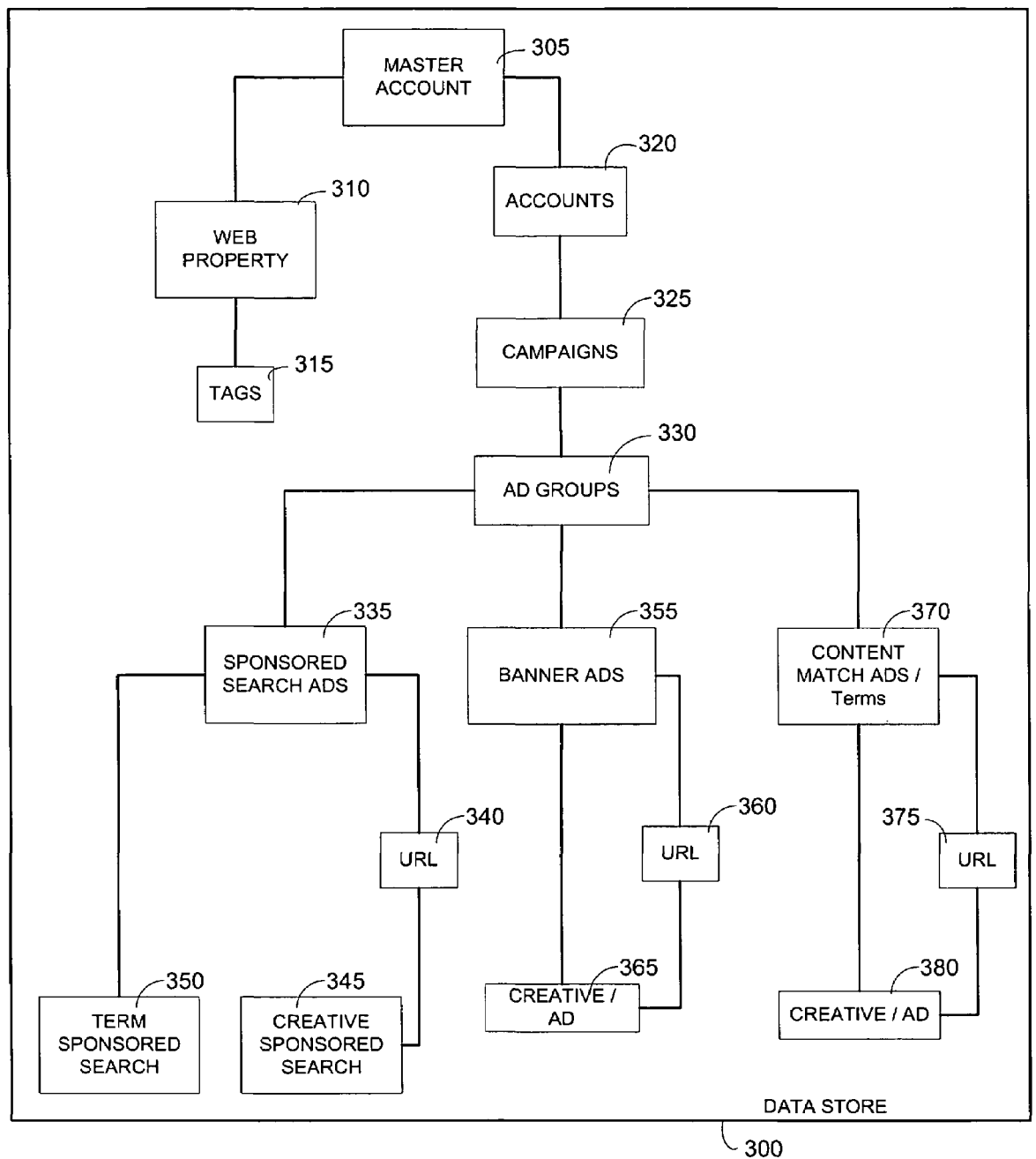
FIG. 3 is a block diagram of one embodiment of a model for the maintenance of advertisement campaign information according to the advertisement campaign management system of FIG. 2.

The CDS 205 is the main data store of pod 200. In one embodiment, CDS 205 stores ad campaign account data, including account access and permission lists, user information, advertisements, data collected from advertiser websites indicative of customer browsing sessions, raw click data received from the advertising channels, third party analytical feeds, ad campaign performance data generated by the system, ad campaign optimization data, including budgets and business rules, etc. In various embodiments of the invention, CDS 205 stores one or more account data structures as illustrated in FIG. 3 and described in greater detail below.

Data in the CDS 205 may be stored and accessed according to various formats, such as a relational format or flat-file format. CDS 205 can be managed using various known database management techniques, such as, for example, SQL-based and Object-based. At the physical level, the CDS 205 is implemented using combinations of one or more of magnetic, optical or tape drives. Furthermore, in one embodiment of the invention, CDS 205 has one or more back up databases that can be used to serve Pod 200 during downtime of CDS 205.

In one embodiment, a pod 200 exposes one or more APIs 210 and UIs 215 which are utilized by the system users, such as advertisers and agencies, to access services of the ad campaign management system, such as for reading data from and writing data to the campaign data store 205. The APIs 210 and UIs 215 may be also provided through a distro component described in detail in U.S. patent application Ser. No. 11/324,129, titled "System and Method for Advertisement Management", filed Dec. 30, 2005, the entirety of which is hereby incorporated herein by reference. The advertisers and their agencies may use the APIs 210, which in one embodiment includes XML-based APIs, to allow access to the ad campaign management system and data contained therein. In one embodiment, the UI 215 comprises a website or web application(s) for enabling user access to the ad campaign management system. The pod 200 utilizes internal APIs 230, which are shared code and functions between the APIs 210 and UI 215, to facilitate interaction with campaign data store 205.

According to some embodiments, the above-described user and application program interfaces are used to facilitate management and optimization of ad campaigns, which include, but are not limited to, management of listings associated with an auction-based search-term related sponsored search results listings marketplace. For example, advertisers use these interfaces to access ad campaign information and ad campaign performance information saved in the ad campaign data store 205, search the information, analyze the information, obtain reports, summaries, etc. Advertisers may also change listings or bidding strategies using these interfaces, which changes are updated in the campaign data store 205.

Furthermore, these interfaces may be used to perform comparisons of the performance of components of ad campaigns, such as performance of particular listings, search terms, creatives, channels, tactics, etc.

While functionality and use of application program interfaces of the pod is described with reference to an auction-based search term-related sponsored listings context, it is to be understood that, in some embodiments, these interfaces may be used with regard to off-line or non-sponsored search ad campaigns and ad campaign performance, or combinations of on-line and off-line ad campaigns information, as well.

A keyword suggestion component 220 provides for keyword suggestion through interfaces 210, 215 for assisting users with ad campaign management. In one embodiment of the invention, the keyword suggestion component 220 assists users to search for available search terms. As described above, in an auction-based system or marketplace, advertisers bid for search terms or groups of terms, which, when used in a search by customers, will cause display advertisement listings or links among the search results. The keyword suggestion component 220 provides suggestions to advertisers regarding terms they should be bidding. In one embodiment, the keyword suggestion component 220 may look at actual searches conducted in the last month and provide a suggestion based upon previous searches. In another embodiment, the keyword suggestion component 220 may look at the terms other advertisers of similar products or services are bidding on and suggest these terms to the advertiser. In yet another embodiment, the keyword suggestion component 220 may determine terms that customers who bought similar products or services use in their searches and suggest these terms to the advertiser. In another embodiment, the keyword suggestion component 220 may maintain a table of terms divided into several categories of products and services and allow an advertiser to browse through and to pick the available terms. In other embodiments, the keyword suggestion component 220 may use other techniques for assisting advertisers in the term selection process, such as suggesting a new term to the advertiser if the advertised products and services are unique.

The editorial processing system (EPS) 225 ensures relevance and mitigates risks of advertisers' listings before a listing can participate in the auction. In general, the EPS 225 reviews new or revised ads. In one embodiment, the EPS 225 applies a set of business rules that determines accuracy and relevance of the advertiser listings. These rules may be applied automatically by the EPS 225 or through a human editorial review. The EPS 225 may, for example, detect inappropriate content in the advertiser listings or illegally used trademark terms. In one, EPS 225 responds with an annotation such as rejected, approved, rejected but suggested changes, etc.

In one embodiment, EPS 225 may comprise a quick check component. The quick check component performs a preliminary or a "quick check" to determine whether to reject ad automatically before it is submitted to a human editor and stored in the campaign data store 205. In one embodiment, either API 210 or a UI 215 invokes the quick check component service so that advertiser can receive instant feedback. For example, use of prohibited words, such as "best" in the submitted advertisement, may be quickly detected by the quick check component and, obviating the need for human editorial review. In contrast, using words such as gambling, adult services, etc., the quick check component might determine that the ad requires a more thorough editorial review. One of the benefits of the quick check component is the rapid provision of feedback to the advertiser, which enables the advertiser to revise the listing right away and thus to expedite review by the human editor.

Again with reference to FIG. 2, according to one embodiment, the pod 100 may further comprise a channel server 250, which is operable to receive and process data received from an advertising channel, such as Google.com and MSN.com. This data may include but is not limited to the customer profiles, historical user behavior information, raw impressions, cost, clicks, etc. Additional description of user information and its uses can be found in U.S. Patent Application No. 60/546,699 and Ser. No. 10/783,383, the entirety of which are both hereby incorporated by reference. The channel server 250 may further be operable to re-format the received data into a format supported by the ad campaign management system and to store the reformatted data into the campaign data store 205.

In one embodiment, pod 200 may further comprise a business information group (BIG) component 255. BIG 255 is operable to receive cost, click, and impression data that is coming into the pod 200 from various sources including the channel server 250, pod collection server 235 and third-party analytics feeds component 280. BIG 255 assures that this data is received in a correct and timely manner. In one embodiment, BIG 255 may also perform aggregation and filtering on raw data impressions that are coming into the pod 100. BIG 255 may be further operable to store the collected and processed data into the Campaign Data Store 205. In other embodiments, BIG 255 may also perform internal reporting, such as preparing business reports and financial projections according to teaching known to those of skill in the art. To that end, in one embodiment, BIG 255 is operable to communicate with the Account Monitoring component 260, which will be described in more detail next.

In one embodiment, the pod 200 may further comprise an account monitoring component 260. This component 260 may be operable to perform budgeting and campaign asset allocation. For example, the account monitoring component 260 may determine how much money is left in a given advertiser's account and how much can be spent on a particular ad campaign. In one embodiment, the account monitoring component 260 may employ a budgeting functionality to provide efficient campaign asset allocation. For example, an advertiser may set an ad campaign budget for a month to $500. The account monitoring component 260 may implement an ad bidding scheme that gets actual spending for that month as close to $500 as possible. One example of a bidding scheme employed by the account monitoring component 260 would be to lower the advertiser's bids to reduce how often the advertiser's ads are displayed, thereby decreasing how much the advertiser spends per month, which may be performed dynamically. Another example of budgeting by the account monitoring component 260 is to throttle the rate at which advertisements are being served (e.g., a fraction of the time it is served) without changing the advertiser's bid (whereas in the previous example the bid was changed, not the rate at which advertisements were served). Another example of throttling is to not serve an ad as often as possible but put it out according to a rotation.

In one embodiment, the pod 200 may further comprise a financial component 265, which may be an accounting application for planning and budgeting ad campaign expenses. Using the financial component 265 advertisers may specify budgets and allocate campaign assets. The financial component 265 provides an advertiser with the ability to change distribution of campaign budget and to move money between different campaigns. The financial component 265 may also present advertisers with information on how much money is left in the account and how much can be spent on a particular ad campaign. In some embodiments, the financial component 265 may further be operable to provide advertisers with information regarding profitability, revenue, and expenses of their ad campaigns. The financial component 265 may, for example, be implemented using one or more financial suites from Oracle Corporation, SAP AG, Peoplesoft Inc., or any other financial software developer.

In one embodiment, pod 200 may further comprise an online sign-up (OLS) component 295. The OLS component 295 may be operable to provide advertisers with a secure online sign-up environment, in which secure information, such as credit card information, can be exchanged. The secure connection between the advertiser computer and the OLS component 295 may be established, for example, using Secure Hypertext Transfer Protocol ("SHTTP"), Secure Sockets Layer ("SSL") or any other public-key cryptographic techniques.

In one embodiment, the pod 200 may further comprise a quality score component 285. A quality score is one of the ad performance parameters that may be used by the search serving components, such as advertising channels and search engines, to qualify the relative quality of the displayed ads. Thus the quality score is calculated by the search serving components and fed into the ad campaign management system through the quality score component 285 in accordance with one embodiment of the present invention. In some embodiments, the quality score is displayed to the advertiser, so that the advertiser may revise the ad to improve its quality score. For example, if an ad has a high quality score, then the advertiser knows not to try to spend money and time trying to perfect the ad. However, if an ad has a low quality score, it may be revised to improve ad's quality score.

In one embodiment, the pod 200 further comprises a forecasting component 290, which is an analytical tool for assisting the advertiser with keyword selection. In some embodiments, the forecasting component is operable to predict keywords trends, forecast volume of visitor traffic based on the ad's position, as well as estimating bid value for certain ad positions.

In one embodiment, the forecasting component 290 is operable to analyze past performance and to discover search term trends in the historical data. For example, the term "iPod" did not even exist several years ago, while now it is a very common term. In another embodiment, the forecasting component 290 performs macro-trending, which may include forecasting to determine terms that are popular in a particular region, for example, California, or with particular demographic, such as males. In yet another embodiment, the forecasting component 290 provides event-related macro- and micro-trending. Such events may include, for example, Mother's Day, Christmas, etc. To perform event-related trending for terms related to, for example, Mother's Day or Christmas, the forecasting component 290 looks at search patterns on flower-related terms or wrapping paper terms. In other embodiments, the forecasting component 290 analyzes the historic data to predict the number of impressions or clicks that may be expected for an ad having a particular rank. In another embodiment, the forecasting component 290 is operable to predict a bid value necessary to place the ad in a particular position.

In one embodiment, the pod 200 further comprises a weight optimizer 270, which may adjust the weights (relative display frequency) for rotating elements as part of alternative ad ("A/B") functionality that may be provided by the ad campaign management system in some embodiments of the present invention. The A/B testing feature allows an advertiser to specify multiple variants of an attribute of an ad. These elements may include creative (title, description and display URL), destination (landing URL) and perhaps other elements such as promotions and display prices. More specifically, when an end-user performs a search, the ad campaign management system assembles one of the possible variants of the relevant ad and provides it to the advertising channel for display to the end-user. The ad campaign management system may also attach tracking codes associated with the ad, indicating which variant of each attribute of the ad was actually served. The behavior of the end-user then may be observed and the tracking codes may be used to provide feedback on the performance of each variant of each attribute of the ad.

In determining the weight for a particular element, the weight optimizer component 270 may look at actual performance of ads to determine optimal ads for delivery. The weight optimizer component 270 operates in multiple modes. For example, in Optimize mode the weight (frequency of display) of each variant is changed over time, based on the measured outcomes associated with each variant. Thus, the weight optimizer component 270 is responsible for changing the weights based on the measured outcomes. The weight optimizer component may also operate according to Static mode, in which the weights (frequency of display) of each variant are not changed by the system. This mode may provide data pertaining to measured outcomes to the advertiser. The advertiser may have the option to manually change the weights.

The pod 200 may further comprise a campaign optimizer component 275, which facilitates ad campaign optimization to meet specific ad campaign strategies, such as increasing number of conversions from displayed ads while minimizing the cost of the campaign. To that end, in some embodiments, campaign optimizer component 275 uses data received from the channel server 250, forecasting component 290, third party analytics feed component 290, quality score component 285, and BIG 255 to determine how much to bid on which ads, how to allocate the budget across different ads, how to spend money over the entire period of the campaign, etc. Furthermore, campaign optimization not only focuses on executing ads efficiently, but also performing arbitrage between ads across various channels and tactics to determine where the limited ad campaign budget is most effective.

In one embodiment, the campaign optimizer component 275 analyzes the obtained analytics data, including ad campaign information, ad campaign performance information, as well as potentially other information, such as user information, to facilitate determining, or to determine, an optimal ad campaign strategy. Herein, an "optimal" ad campaign strategy includes any ad campaign strategy that is determined to be optimal or superior to other strategies, determined to be likely to be optimal, forecasted or anticipated to be optimal or likely to be optimal, etc. In some embodiments, optimizing is performed with respect to parameters, or a combination of parameters, specified by an advertiser, supplied automatically or partially automatically by the ad campaigns facilitation program, or in other ways.

In addition to the foregoing, ad campaign strategy may include any course of action (including, for example, changing or not changing current settings or strategy) or conduct, or aspects or components thereof, relating to an ad campaign. An ad campaign strategy may include a recommendation regarding a course of action regarding one or more aspects or parameters of an ad campaign, and may include an immediate course of action or set of parameters, or a course of action or set of parameters for a specified window of time. For example, an optimal ad campaign strategy in the context of an auction-based search result listings situation, may include recommendations relating to bidding and bid hiding rates in connection with an auction or marketplace relating to search term or group of terms in connection with sponsored listings.

In some embodiments, the campaign optimizer component 275 may be operable to analyze ad campaign performance information to determine an optimal ad campaign strategy. Ad campaign performance information may include a variety of information pertaining to historical performance of an ad campaign, channel, tactic, or ad or group of ads. Ad campaign performance information can include many types of information indicating or providing a suggestion of how effectively ads, or ads presented though a particular channel, etc., influence or are likely to influence user or consumer behavior. For example, an advertising channel such as Yahoo! may collect performance information with respect to a particular sponsored search result listing. The information may include a number or percentage of viewers who clicked on the link, or who shopped at or purchased a product at the advertisers Web site as a result of the listing, etc.

The campaign optimizer component 275 may be operable to analyze ad campaign information to determine an optimal ad campaign strategy. Ad campaign information may include campaign objectives or budget-related conditions or constraints, or can include information specifying, defining, or describing ads themselves, channels, tactics, etc. With regard to auction-based sponsored search result listings, ad campaign information can include bidding parameters such as maximum or minimum bids or bidding positions (rankings or prominence of listings) associated with a term or term cluster, for instance, as further described below. Such ad campaign information can also include campaign objectives, quotas or goals expressed, for example in metrics such as ROAS (return on ad spend), CPI (clicks per impression), or in other metrics, and with respect to individual ads, terms or term groups, channels, tactics, etc.

The campaign optimizer component 275 may further include bid optimization functionality, which may be used by the system to determine a desirable or optimal bid for a listing, such as a paid search result. The bid optimization functionality of the campaign optimizer component 275 may be used to constrain the set targets and constraints on the bids set by an advertiser. The constraints may include a maximum bid and a minimum bid. The targets may be associated with the listing and can be specified in terms of one or more metrics related to the performance of the listing. The campaign optimizer component 275 may analyze recent past analytics in connection with the metric and specify a bid recommendation forecasted by the bid optimizer functionality to achieve the target or get as close to the target as possible. In some embodiments, the campaign optimizer component 275 can also provide a recommendation for a listing, which may include a maximum bid and an update period, which update period can be a time between maximum bid hiding updates.

To facilitate ad campaign management and optimization, the pod 100 is further operable to collect visitor state data from the advertiser websites in accordance with a preferred embodiment of the ad campaign management system. To that end, the pod 200 utilized pod collection server 235, script server 240, and image server 245 to collect visitor state data and to store the same in the campaign data store 205. The collected visitor state data may then be used by various components of the pod 200 including, but not limited to, campaign optimizer component 275, forecasting component 290, and BIG 255 to generate ad campaign performance data in accordance with various embodiments of the present disclosure.

The various methods of data collection in accordance with various embodiments of the present invention may include, but are not limited to, full analytic, campaign only, conversion counter and sampling. In one embodiment, full analytics collection provides the most robust collection method. The full analytics collection collects marketing-based and free search-based leads. As a result, the advertiser may see a complete picture of how leads and conversions are generated. Primarily, the full analytics collection method provides a full funnel report that will provide a key view into how visitors of the advertiser website go from being a lead through to browser, shopper, and finally a paying customer. Visitor state storage on Campaign Data Store 205 may also allow for repeat and return customer report data and for a full suite of accreditation methods.

In another embodiment, a campaign only analytics collection method is much like full analytic but only paid marketing events are tracked and result events generated from free search are ignored or discarded. This has the advantage of providing funnel and repeating visitor reports as well as a reduced data collection and storage rate. The campaign only analytics method provides a balance of rich report data and reduced collection, processing, and storage cost.

In yet another embodiment, the conversion counter method is the most simple analytics data collection available. With conversion counter analytics, the advertiser only places a tag on pages where revenue is generated. The image server 245 places the lead "stack" in a cookie, which may be used to accredit the proper term/creative to the conversion event. This data collection mechanism generates enough data to provide optimization on creative weighting. It should be further noted that in one embodiment a direct accreditation method may be applied to the conversion counter method. In the conversion counter approach, no visitor state storage is needed and only conversion events are received. Thus, this approach has a minimal effect on pod 200 load and data storage requirements. In another embodiment, a sampling method is utilized. In accordance with this method, only a random number of unique visitors, for example, 10%, are tracked, which reduces data collection and storage.

In order to allow for accreditation of the lead generation source to a conversion event, the state of the customer session on the advertiser's website may be maintained. Accreditation is the process by which all the marketing events are tied to a specific, or set of specific, marketing activities. There are two known approaches that may be utilized for storage of visitor state: client-side cookies and server-side database.

In one embodiment, cookies may be used as an exemplary client-side visitor state storage. When cookies are used to store visitor state one of two methods may be used to store visitor state. A redirection server used on the lead generating event may add the visitor state to the cookie at the click event. Alternatively a collection server may set the cookie at the time of a lead event. While visitor state in the cookie approach is the most cost effective it has several disadvantages. Generally, cookies have low storage requirements and thus an active search user (typically, most valuable users because they generate the most revenue) could lose accreditation information as their lead stack grows and causes some older events to be pushed out. As a result, a conversion event could occur where the lead information was lost in the stack and thus the accreditation is lost. Furthermore, cookie-off users are essentially invisible to the system. Moreover, efficacy is reduced due to the additional time needed to parse the collection server request when the cookie is set, which may cause end users to click away from the lead page before the cookie can be completed. Finally, cookie based visitor state storage prevents any internal analysis of user behavior.

In another embodiment, server-side database, such as the CDS 205, may be used to store visitor state. Using server side storage in a database offers the high efficacy rates but at the additional cost of the storage. Using server side storage of visitor state allows the ad campaign management system to have more advanced accreditation models, which could allow for assist-based accreditation. Efficacy rates over cookie based visitor state storage are increased due to many factors. Primarily the system is no longer limited in the amount of visitor state storage a single user can have so no lead loss would occur. Cookies off users can still be traced as unique visitors so they can still be tracked (although at a reduced rate of accuracy) and thus are able to be included. Collection event processing latency is greatly reduced because the event can be just logged and then actually processed later. With the cookie approach lead accreditation has to occur at the time the event is received because the cookie must be evaluated before the request is returned by the beacon servers. Furthermore, with visitor state stored in the campaign data store, valuable marketing data can be collected and analyzed for internal use.

In one embodiment, the ad campaign management system utilizes a combination of the above-described client-side cookies and server-side database techniques to collect and maintain visitor state data. In particular, as indicated above the pod 200 utilizes pod collection server 235, script server 240, and image server 245 to collect visitor state data and to store the same in the campaign data store 205. In one embodiment, the pod collection server 235, script server 240 and image server 245 may be implemented, for example, as Java servlets.

FIG. 3 is a diagram of one embodiment of a model for the maintenance of ads according to the ad campaign management system of FIG. 2. As depicted, an ad campaign management system comprises a data store 300 that facilitates hierarchical storage of ad campaign data, providing advertisers with multiple levels of structure for control of advertisement content. In particular, an advertiser utilizing services of the ad campaign management system may be provided with a master account 305 for receiving aggregated analytics relating to the master account 305 and managing or optimizing Web properties 310 and advertisements within the master account 305 based on the aggregated analytics. A Web property 310 may include a website, or a combination of related websites and pages for which the advertiser is advertising. Furthermore, within master account 305, an advertiser may create several accounts 320 to separately manage ad campaigns, as well as to collect ad performance information.

To facilitate tracking and collection of ad performance data from Web properties 310, data store 300 further maintains custom tags, program code, navigation code, etc. 315. According to one embodiment, a tag 315 may comprise a piece of code that is created by the system and placed on relevant Web pages of a given website to allow automatic tracking and collection of data indicative of customer session on the advertiser website. For example, a tag may be used to track user visits, interaction, or purchases from a website to which a user navigates as a result of clicking on an advertisement link associated with the website. Depending on specific needs and business objective of a given advertiser, tags may be coded to collect specific information about the customer session that is of interest to the advertiser. Thus, some tags may enable collection of data on numbers of raw clicks on the advertiser website, while others tags may track numbers of clicks that resulted in conversions, e.g., purchase of a product or service from the advertiser website. Those of skill in the art will recognize that data collection may be limited to other portions of the customer session.

Some embodiments utilize, or may be combined with, features or technologies, such as, for example, HTML tagging, data tracking, and related technologies, as described in U.S. patent application Ser. Nos. 09/832,434 and 09/587,236, the entirety of which are both hereby incorporated herein by reference.

In one embodiment, within a master account 305, an advertiser may maintain one or more accounts 320, which may be used to receive analytics related to a specific account 320 and manage ad campaign spending associated with individual Web properties 310. Thus, accounts 320 allow advertisers to distribute their advertising funding between different Web properties 310 and between separate ad campaigns 325. A given ad campaign 325 may include a set of one or more advertising activities or conduct directed to accomplishing a common advertising goal, such as the marketing or sales of a particular product, service, or content, or group of products, services or content. Two ad campaigns may be considered disparate when the ad campaigns are directed to different advertising goals. For example, an advertiser may wish to advertise a product for sale and a service associated with this product. Thus, the advertiser may store separate ad campaigns 325 for advertising the product and the service.

In one embodiment, storage of an ad campaign 325 may be further subdivided into several ad groups 330. An ad Group 330 may be thought of as a conceptual compartment or container that includes ads and ad parameters for ads that are going to be handled in a similar manner. An ad group 330 may allow for micro-targeting, e.g., grouping ads targeted to a given audience, a demographic group, or a family of products. For example, an ad group may be related to a given manufacturer's products, such as Sony, Microsoft, etc. or a family of high-end electronics, such as TVs, DVDs, etc. There is a number of ways in which a given group of ads may be managed in a similar manner. For example, an advertiser may specify that there be a certain markup (e.g., 50%) on items in a given ad group, may want to distribute all those ads in a certain way, or may want to spend a certain amount of its budget on those advertisements. Further, an ad group 330 provides a convenient tool for an advertiser to move a large group of ads and ad parameters from one ad campaign 325 to another ad campaign 325, or to clone a large group of ads and ad parameters from one ad campaign 325 to another ad campaign 325

In one embodiment, changes made to the parameters of a given ad group 330 may apply to all ads within the given ad group. For example, one such parameter may be pricing. For a sponsored search, an advertiser may set the default price for the whole ad group but may override the price on each individual term. Similarly, an advertiser may further specify that certain terms are low value, but decide to increase the amount spent on another term uniformly across all ads in a given ad group. Thus, storage according to one or more ad groups 330 enables advertisers to bridge the gap between ad campaigns and the individual ads comprising a given ad campaign.

A given ad may contain one or more items of advertising content that are used to create ads/terms in an ad group, including, but not limited to, creatives (e.g., titles, descriptions) and destination URLs (plus associated URL tracking codes). Optionally, a given ad may contain a {KEYWORD} token for substitution in the title, description, or other ad component. Furthermore, ads may exist as a template in an ad library (not pictured) that can be reused across ad groups or a local ad that is used and stored only within a specific ad group. The ad library, which may be provided by the ad campaign management system, allows advertisers to store ad templates, sharing and reusing them across campaigns and ad groups. Ads in the ad library may be shared within an account, e.g., each account has its own library.

An ad group 330 may utilize numerous tactics for achieving advertising goals. The term "tactic" includes a particular form or type of advertising. For example, in on-line advertising, tactics may include sponsored search result listings 335, banner advertisements 355, content match 370, etc. In off-line advertising, tactics may include television commercials, radio commercials, newspaper advertisements, etc. In different embodiments, tactics may include subsets or supersets of the listed examples or other examples. For instance, on-line advertising is an example of a broader tactic than the narrower tactic of sponsored search result listings. Furthermore, the advertiser may utilize multiple advertising channels for different tactics. For example, the advertiser may utilize sponsored search listings in several websites or portals, such as Yahoo!, Google.com, MSN.com, etc. In one embodiment, a user may set parameters within the ad group 330 to place a spend limit for each type of advertising tactic comprising the ad group 330.

One example of an advertising tactic is sponsored search 335. According to one embodiment, sponsored search 335 operates as follows: an auction-based system or marketplace is used by advertisers to bid for search terms or groups of terms, which, when used in a search, causes the display of a given advertiser's ad listings or links among the display results. Advertisers may further bid for position or prominence of their listings in the search results. With regard to auction-based sponsored search 335, a given advertiser may provide a uniform resource locator (URL) 340 to the webpage to which the ad should take the customer if clicked on, as well as the text of the advertisement 345 that should be displayed. Advertiser may further identify one or more terms 350 that should be associated with the advertisement 345.

Another example of advertising tactic is content match 370. Storage of content match advertisements 380 may be used by the advertiser to complement, or as alternative to, the sponsored search tactic 335. Ads stored according to the content match tactic 370 are displayed alongside relevant articles, product reviews, etc, presented to the customers. For the content match tactic 370, data store 300 stores one or more URLs 375 identifying the address of a webpage where given ad should take the customer if clicked on, as well as the text, image, video or other type of multimedia comprising the creative portion of the advertisement 380.

Yet another example of an advertising tactic is banner ad 355. Banner ad tactic 355 may be used by the advertiser to complement, or as alternative to, the sponsored search tactic 335 and content match tactic 370. In contrast to the sponsored search tactic and content match tactic, which are usually based on a pay-per-click payment scheme, an advertiser pays for every display of the banner ad 365, referred to as an impression. Alternatively, if the banner ad displays a phone number, advertiser may only be billed when a user calls the phone number associated with the advertisement. Thus, for the banner ad tactic, the data store 300 maintains a URL 360 to the webpage where the ad should take the customer if clicked on, as well as the creative that comprises the banner ad 365.

The data store 300 of the ad campaign management system may further store various parameters for each ad group. Such parameters may include, for example, maximum or minimum bids or bidding positions (rankings or prominence of listings) associated with a term or term cluster for the particular ad group or ads within a given ad group. As described above, in embodiments of an auction-based sponsored search result listings environment, prominence or rank of listings is closely related to ad performance, and therefore a useful parameter in ad campaign management. The rank of a given ad determines the quality of the placement of the ad on pages that are displayed to customers. Although details vary by advertising channel, top-ranked listings typically appear at the top of a page, the next listings appear in the right rail and additional listings appear at the bottom of the page. Listings ranked below the top five or so will appear on subsequent search results pages.

There is a correlation between rank and both number of impressions and click-through rate (clicks per impression), which provides an opportunity for advertisers to pay more per click (get a higher rank) in order to get more visitors to their web site. The result is that an advertiser may determine, how much the advertiser should be willing to bid for each listing based on the advertiser's business objectives and the quality of the traffic on their web site that is generated by the listing. This information may also be stored for a given ad group 330 in the data store 300 of the ad campaign management system of the present invention.

FIGS. 4-8 describe different methods and systems that may be used to suggest semantically related terms to users such as in the keyword suggestion component 220 described above. The systems and method used below may determine semantically related terms based on information such as advertisement data from an advertisement campaign management system, search engine logs, or webpage content.

Figure 4:
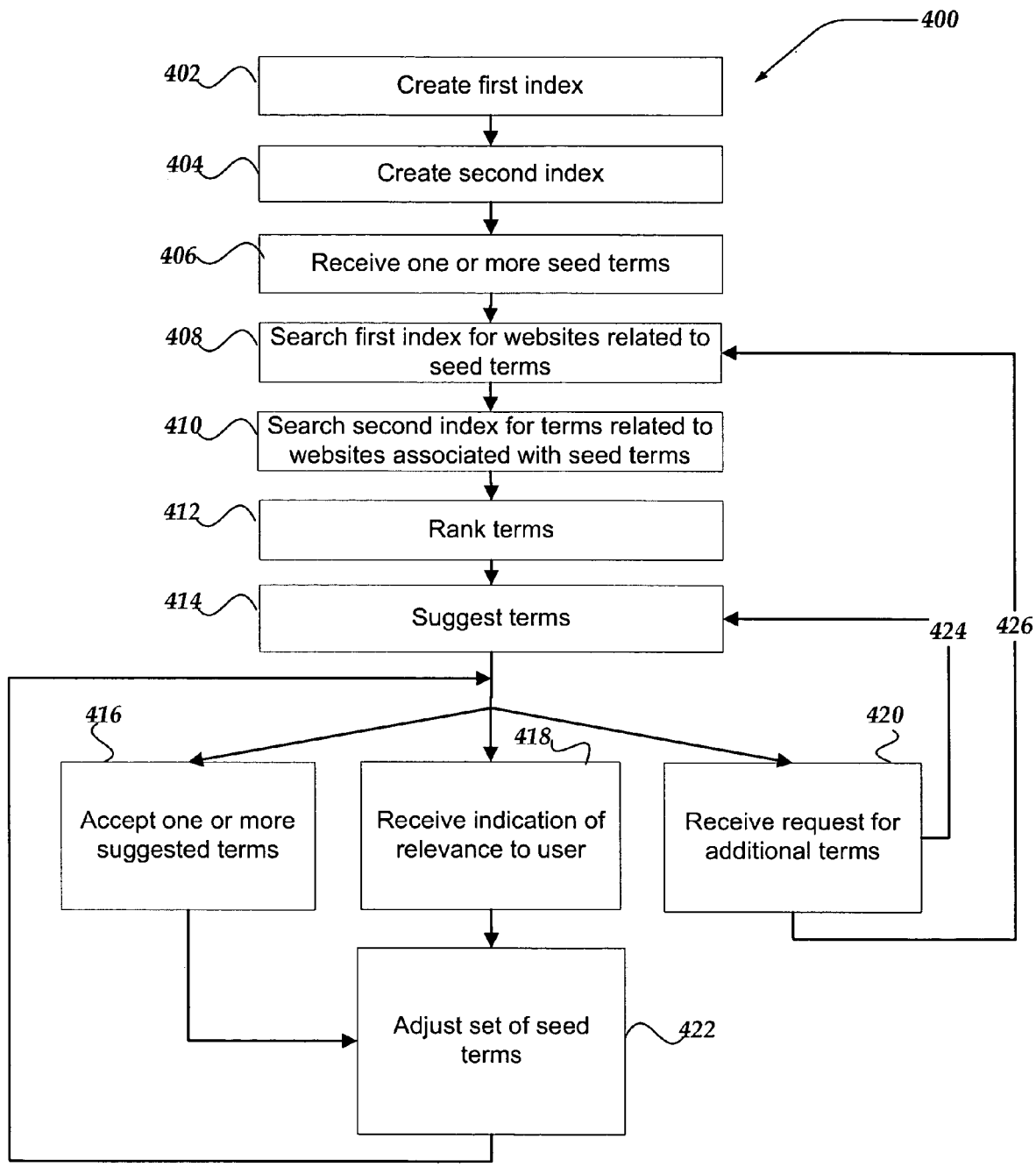
FIG. 4 is a flow chart of one embodiment of a method for discovering semantically related terms based an advertisement data from an advertisement campaign management system.

FIG. 4 is a flow chart of one embodiment of a method for discovering semantically related terms based on advertisement data from an advertisement campaign management system. Generally, an advertisement campaign management system creates one or more indexes based at least in part on information associated with advertisers who are currently, or have previously, advertised with the advertisement campaign management system. In one implementation, the advertisement campaign management system creates a first index and a second index. The first index associates, for each term currently available or previously available to bid on at the advertisement campaign management system, all of the Uniform Resource Locators ("URLs") that are currently or have been previously associated with each term at the advertisement campaign management system. The second index associates, for each URL that is currently, or has been previously, associated with an advertiser at an advertisement campaign management system, all of the terms that are currently or have been previously associated with each URL at the advertisement campaign management system. In other implementations, the advertisement campaign management system may combine the first and second index into a single index, or expand the first and second index into any number of indexes.

After the advertisement campaign management system creates one or more indexes, an advertiser submits one or more seed terms to the advertisement campaign management system. The advertisement campaign management system uses the first index to determine one or more webpages associated with the seed terms. The advertisement campaign management system then uses the second index to determine one or more potential terms associated with the webpages associated with the seed terms.

The advertisement campaign management system suggests a portion of the potential terms to the user. Typically, the advertisement campaign management system receives an indication from the advertiser regarding the relevance of one or more of the suggested terms to the advertiser. The advertisement campaign management system may adjust the seed terms to incorporate one or more of the suggested terms to create a new set of seed terms. The advertisement campaign management system then repeats the above process using the new set of seed terms to determine a new set of potential terms. Modifying the seed terms to incorporate one or more of the suggested terms allows the advertisement campaign management system to continue to provide relevant and precise suggested terms to an advertiser as the interest or focus of the advertiser changes. It will be appreciated that this process may continue any number of times desired by the advertiser.

The method 400 begins with an advertisement campaign management system creating one or more indexes based at least in part on information associated with advertisers advertising with the advertisement campaign management system. In one embodiment, the advertisement campaign management system creates a first index 402 and creates a second index 404. The first index relates for each term currently or previously available for an advertiser to bid on at the advertisement campaign management system, all of the webpages currently or previously associated with the term at the advertisement campaign management system. Conceptually, the first index can be thought of as a table where a user can determine all of the webpages currently or previously associated with a term. The second index 404 relates for each webpage currently or previously associated with an advertiser at the advertisement campaign management system, all of the terms currently or previously associated with the webpage. Conceptually, the second index can be thought of as a table wherein a user can determine all of the terms currently or previously associated with a webpage.

The advertisement campaign management system receives one or more seed terms from an advertiser 406. Each of the seed terms may be a single word or a phrase. Further, each of the seed terms may be a positive seed term or a negative seed term. A positive seed term is a term that represents the type of keywords an advertiser would like to bid on to have the advertisement campaign management system serve an advertisement. A negative seed term is a term that represents the type of keyword an advertiser would not like to bid on to have the advertisement campaign management system serve an advertisement. In other words, an advertiser uses a keyword suggestion tool to receive more keywords like a positive seed terms, while avoiding keywords like a negative seed term.

The advertisement campaign management system uses the first index to determine a plurality of webpages associated with the seed terms 408. It will be appreciated that if the advertisement campaign management system receives more than one seed term, the advertisement campaign management system may implement an algorithm to determine a plurality of webpages that is most relevant to all of the received seed terms. Further, it will be appreciated that if the advertisement campaign management system receives both positive and negative seed terms, the advertisement campaign management system may implement an algorithm to determine a plurality of webpages that is most relevant to the positive seed terms while avoiding webpages associated with the negative seed terms.

In one embodiment, the advertisement campaign management system first assigns a score to each webpage relating to the webpage's association with one of the seed terms. The advertisement campaign management system then totals the scores of each webpage relating to each of the seed terms. The advertisement campaign management system examines the total score of each webpage, and based on the webpages having the highest score, determines a plurality of webpages that is most relevant to all of the seed terms.

The advertisement campaign management system uses the second index to determine a plurality of potential terms associated with the webpages associated with the seed terms 410. In one embodiment, the advertisement campaign management system first assigns a score to each term relating to the term's association with one of the webpages relating to the seed terms. The advertisement campaign management system then totals the scores of each term relating to each webpage associated with the seed terms. The advertisement campaign management system examines the total score of each term, and based on the terms having the highest score, determines a plurality of potential terms that is most relevant to the webpages associated with the seed terms.

The advertisement campaign management system may rank the plurality of potential terms 412 and suggest a portion of the potential terms to an advertiser 414. In one implementation, the advertisement campaign management system ranks the plurality of potential terms based on the total score of each term relating to each webpage associated with the seed terms as described above.

After receiving the suggested terms, a user may choose whether to accept one or more of the suggested terms 416, send an indication to the advertisement campaign management system regarding the relevance of one or more of the suggested terms to the advertiser 418, and/or request additional suggested terms 420.

If the advertiser chooses to accept one or more of the suggested terms 416 or indicates a relevance of one or more suggested terms to the advertiser 418, the advertisement campaign management system adjusts the set of seed terms 422. The advertisement campaign management system may adjust the set of seed terms by including one or more terms that the advertiser has accepted or by including one or more terms that the advertiser has indicated the relevance of. With respect to suggested terms the advertiser has indicated the relevance of, the advertisement campaign management system my add one or more terms that the advertiser has indicated are relevant to the advertiser as positive seed terms and/or add one or more terms that the advertiser has indicated are not relevant to the advertiser as negative seed terms. Further, the advertisement campaign management system may adjust the set of seed terms by removing any seed terms currently in the set of seed terms or ensuring that certain seed terms such as negative seed terms remain in the set of seed terms.

In one implementation, the advertisement campaign management system maintains a set of seed terms including a predetermined maximum number of seed terms such as fifty. When the advertisement campaign management system adjusts the set of seed terms, the advertisement campaign management system maintains any negative seed terms. Further, the advertisement campaign management system includes one or more terms the advertiser has indicated are not relevant to the advertiser as negative seed terms. Additionally, the advertisement campaign management system includes one or more terms the advertiser has indicated are relevant to the advertiser as positive seed terms. If after adding the new positive and negative seed terms to the set of seed terms, the number of seed terms in the set of seed terms is more than the predetermined maximum number of seed terms, the advertisement campaign management system may remove seed terms from the set of seed terms. Therefore, after adjusting the set of seed terms, the set of seed terms may or may not include any of the seed terms the advertiser originally sent to the advertisement campaign management system.

If the advertiser requests additional terms 420 and the advertisement campaign management system has not adjusted the set of seed terms, the advertisement campaign management system loops 424 and may present additional potential terms 414 as previously determined in step 410.

If the advertiser request additional terms 420 and the advertisement campaign management system has adjusted the set of seed terms 422, the advertisement campaign management system loops 426 to step 408. The advertisement campaign management system uses the first index to determine a plurality of webpages associated with the new set of seed terms and the above-described process is repeated.

The Advertisement campaign management system may continue to suggest terms to a user and allow the user to choose whether to accept one or more of the suggested terms 416, send an indication to the advertisement campaign management system regarding the relevance of one or more suggested terms to the advertiser 418, and/or request additional suggested terms 420 until the user instructs the advertisement campaign management system to stop suggesting terms.

As more users complete the method described above with respect to FIG. 4, the advertisement service provider may calculate continuous degrees of relevance between terms and webpages, or between terms and other terms, based on all users who complete the system above. Calculating a continuous degree of relevance between terms and webpages or terms and other terms allows the advertisement campaign management to build an index that includes reliable degrees of relevance for accurately suggesting semantically related terms to users.

To build the index, each time the advertisement campaign management system suggests a set of terms and receives an indication of relevance to the advertiser, the advertisement campaign management system may reweigh a degree of relevance between a term and one or more webpages, or between a term and one or more other terms. For example, if an advertiser indicates a suggested term is relevant to the advertiser, the advertisement campaign management system may increase a degree of relevance to the seed terms associated with each webpage associated with both the seed terms and the relevant suggested term and/or increase a degree of relevance to the seed term for each term associated with both the seed terms and the relevant suggested term. Additionally, the advertisement campaign management system may decrease the degree of relevance to the seed terms associated with each webpage that is not associated with both the seed terms and the relevant suggested term and/or decrease a degree of relevance to the seed terms for each term not associated with both the seed terms and the relevant suggested term.

Similarly, if an advertiser indicates a suggested term is not relevant to the advertiser, the advertisement campaign management system may decrease a degree of relevance to the seed terms associated with each webpage associated with both the seed terms and the irrelevant suggested term and/or may decrease a degree of relevance to the seed terms associated with each term associated with both the seed terms and the irrelevant suggested term. Additionally, the advertisement campaign management system may increase the degree of relevance to the seed terms associated with each webpage that is not associated with both the seed terms and the irrelevant suggested term and/or may increase the degree of relevance to the seed terms associated with each term not associated with both the seed terms and the irrelevant suggested term.

In one embodiment, an advertiser may simply indicate that a suggested term is relevant to the advertiser or is not relevant to the advertiser. However in other embodiments, an advertiser may indicate that a suggested term is relevant to the advertiser or not relevant to the advertiser on a scale, such as 1 to 10. If an advertiser indicates a relevance of a suggested term to the advertiser on a scale, the advertisement campaign management system may weigh degrees of relevance in proportion to the indicated degree of relevance on a scale.

Figure 5A:
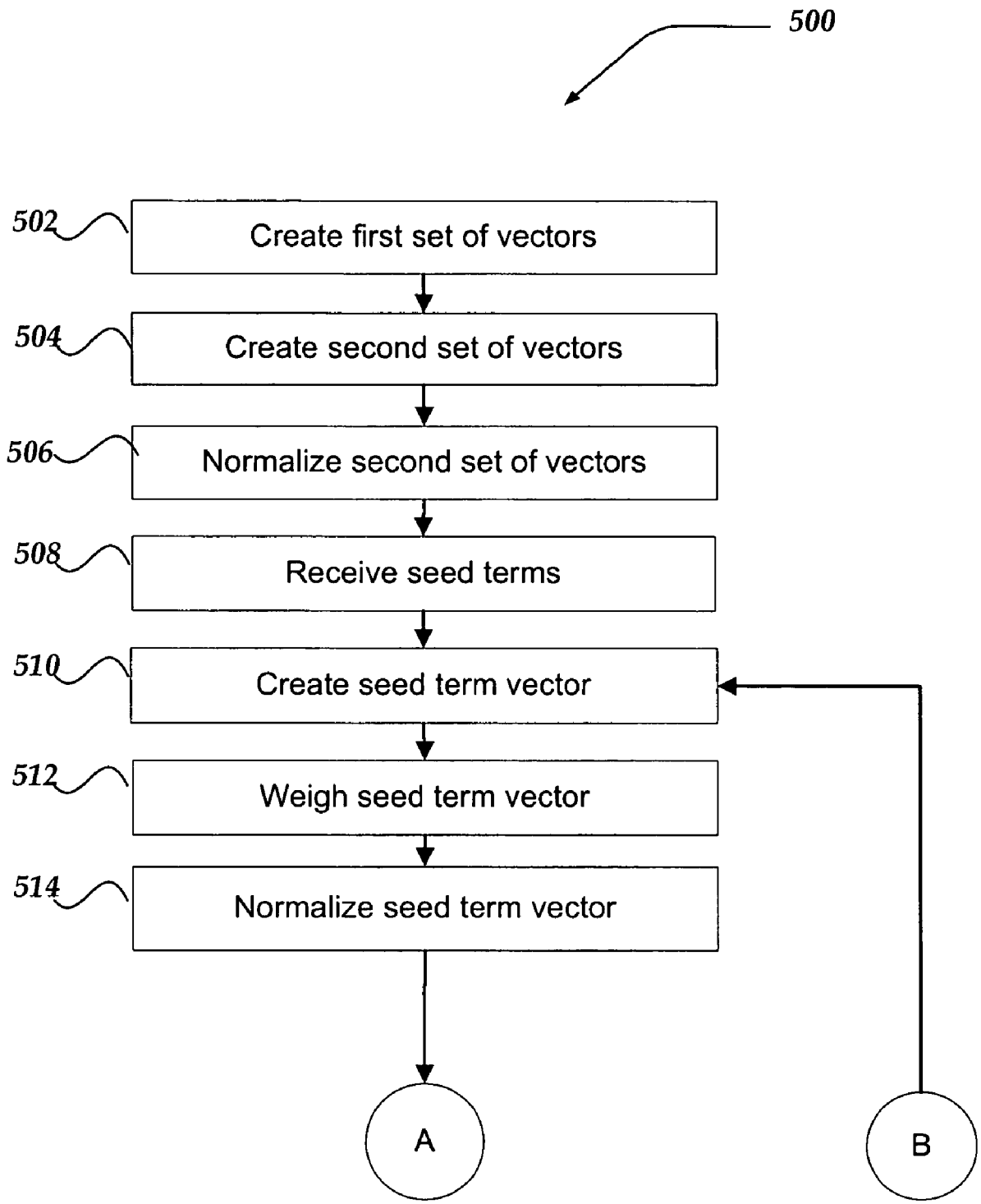
FIGS. 5a and 5b are a flow chart of another embodiment of a method for discovering semantically related terms based on advertisement data from an advertisement campaign management system.
Figure 5B:
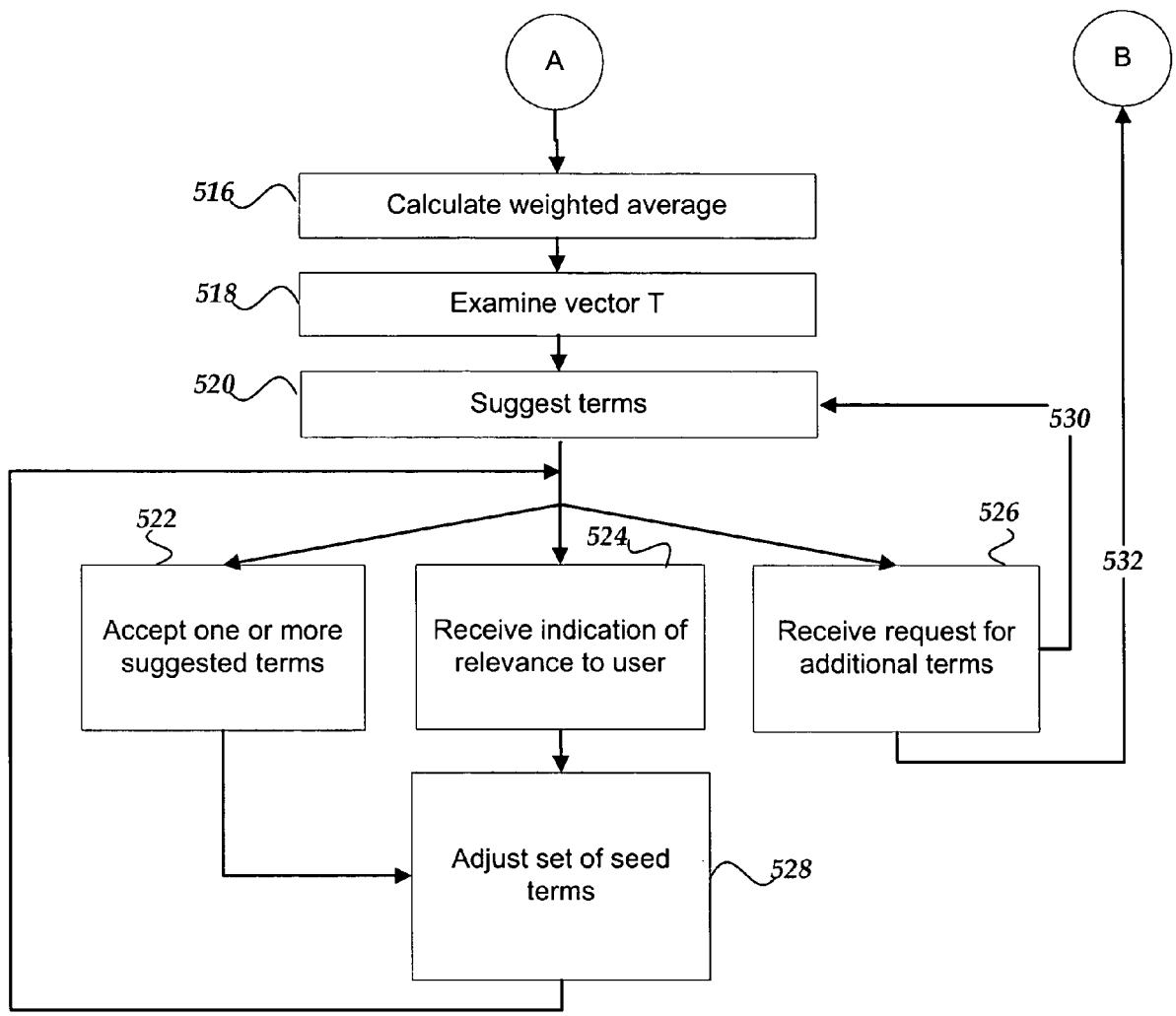

FIGS. 5a and 5b are another embodiment of a method for determining semantically related terms. The method 500 begins with an advertisement campaign management system creating a first set of vectors 502 associating for each webpage currently or previously bid on at the advertisement campaign management system, whether each term at the advertisement campaign management system is currently or has been previously associated with the webpage. In one implementation, each entry in the first set of vectors will comprise a positive non-zero number if the term of the entry is associated with the relevant webpage and the number zero if the term of the entry is not associated with the relevant webpage.

The advertisement campaign management system additionally creates a second set of vectors 504. The advertisement campaign management system creates the second set of vectors by weighing the entries of the first set of vectors based on one or more factors. The advertisement campaign management system may weight the entries of the first set of vectors to create the second set of vectors based on factors such as a number of webpages associated with each term at the advertisement campaign management system or a click-through rate for a webpage after a search for a term. In one implementation, the advertisement campaign management system weighs each entry of the first set of vectors to create the second set of vectors by multiplying each entry of the first set of vectors by the logarithm of the quantity the total number of webpages at the advertisement campaign management system over the total number of webpages associated with the term of the entry.

The advertisement campaign management system may additionally normalize the second set of vectors 506 so that the magnitude of each vector of the second set of vectors is one. Normalizing the second set of vectors adjusts the weight of each entry of the second set of vectors so that entries in the second set of vectors for webpages associated with more terms have less value that entries in the second set of vectors for webpages associated with fewer terms.

The advertisement campaign management system receives one or more seed terms from a user such as an advertiser 508. As discussed above, each of the seed terms may be a single word or a phrase. Additionally, each seed term may be a positive seed term or a negative seed term. The campaign advertisement management system creates a seed term vector based on the received seed terms 510. In one implementation, the seed term vector comprises a value for each term at the advertisement campaign management system, where the value of the entry is a positive non-zero number if the term is a positive seed term, the value of the entry a negative non-zero number if the term is a negative seed term, and the value of the entry is zero if the term is not a seed term.

The advertisement campaign management system may weigh each entry of the seed term vector 512 based on how may websites each seed term is associated with or the click-through rate of each website after searching for the seed term. The advertisement campaign management system may additionally normalize the seed term vector 514 so that the magnitude of the seed term vector is one.

The advertisement campaign management system calculates a weighted average 516 over a number of webpages at the advertisement campaign management system to determine a plurality of potential terms semantically related to the seed terms. In one embodiment, the advertisement campaign management system calculates the weighted average 516 over all webpages at the advertisement campaign management system. However, in other embodiments, the advertisement campaign management system calculates the weighted average 516 over a number of webpages that is less than the total number of webpages at the advertisement campaign management system. For example, the advertisement campaign management system may determine a number of webpages, such as 10,000 webpages, that are closest to the seed terms based on the entries in the second set of vectors. The advertisement campaign management system then calculates the weighted average of the predetermined number of webpages that the advertisement campaign management system determined are closest to the seed terms.

Specifically, the advertisement campaign management system calculates a weighted average as a function of the first and second set of vectors and the seed term vector. In one embodiment, the weighted average is calculated using the function:

$$T = \text{Sum of } (V1 * \text{cosine}(V2, S)),$$

wherein V1*cosine(V2,S) is calculated for a number of webpages at the advertisement campaign management system; V1 is the relevant vector of the first set of vectors indicating for each term at the advertisement campaign management system, whether a term at the advertisement campaign management system is associated with the relevant webpage; V2 is the relevant vector of the second set of vectors including for each term at the advertisement campaign management system, an entry indicating a weight of a term associated with the webpage; and S is the seed term vector indicating for each term at the advertisement campaign management system, whether the term is one of the seed terms received by a user.

As discussed above, the advertisement campaign management system may calculate the sum of (V1*cosine(V2,S)) for all webpages at the advertisement campaign management system. However, in other implementations, the advertisement campaign management system may calculate V1*cosine(V2,S) for all webpages at the advertisement campaign management system but only sum the result V1*cosine (V2,S) for a limited number of webpages to create the vector T. In this implementation, the advertisement campaign management system examines the result of V1*cosine(V2,S) for all webpages to determine a number of webpages that are closest to the seed terms. The advertisement campaign management system then sums the result of V1*cosine(V2,S) for the webpages that the advertisement campaign management system determines are closest to the seed terms to create the vector T. In one embodiment, the advertisement campaign management system may sum the result of V1*cosine(V2,S) for the top 10,000 webpages that are closest to the seed terms to create the vector T, but the advertisement campaign management system may sum the result of V1*cosine(V2,S) over any number of webpages to create the vector T.

After calculating the sum of (V1*cosine(V2,S)), T will comprise a vector having a value for each term at the advertisement campaign management system. The advertisement campaign management system exams the resulting vector T to determine the terms having the highest corresponding entries after the weighted average 518. In one embodiment, the advertisement campaign management system may determine the top ten terms having the highest value in the resulting vector T after the weighted average, but the advertisement campaign management system may determine any number of top terms. The advertisement campaign management system then suggests 520 at least a portion of the terms determined in step 518 to the user.

After receiving the suggested terms, a user may choose whether to accept one or more of the suggested terms 522, send an indication to the advertisement campaign management system regarding the relevance of one or more of the suggested terms to the advertiser 524, and/or request additional suggested terms 526.

If the advertiser chooses to accept one or more of the suggested terms 522 or indicates a relevance of one or more suggested terms to the advertiser 524, the advertisement campaign management system adjusts the set of seed terms 528 as described above.

If the advertiser requests additional terms 526 and the advertisement campaign management system has not adjusted the set of seed terms, the advertisement campaign management system loops 530 and may present additional potential terms 520 as previously determined in step 518.

If the advertiser request additional terms 526 and the advertisement campaign management system has adjusted the set of seed terms 528, the advertisement campaign management system loops 532 to step 510. The advertisement campaign management system creates a seed term vector based on the new set of seed terms created in step 528 and the above-described process is repeated.

The advertisement campaign management system may continue to suggest terms to a user and allow the user to choose whether to accept one or more of the suggested terms 522, send an indication to the advertisement campaign management system regarding the relevance of one or more suggested terms to the advertiser 524, and/or request additional suggested terms 526 until the user instructs the advertisement campaign management system to stop suggesting search terms.

Figure 6:
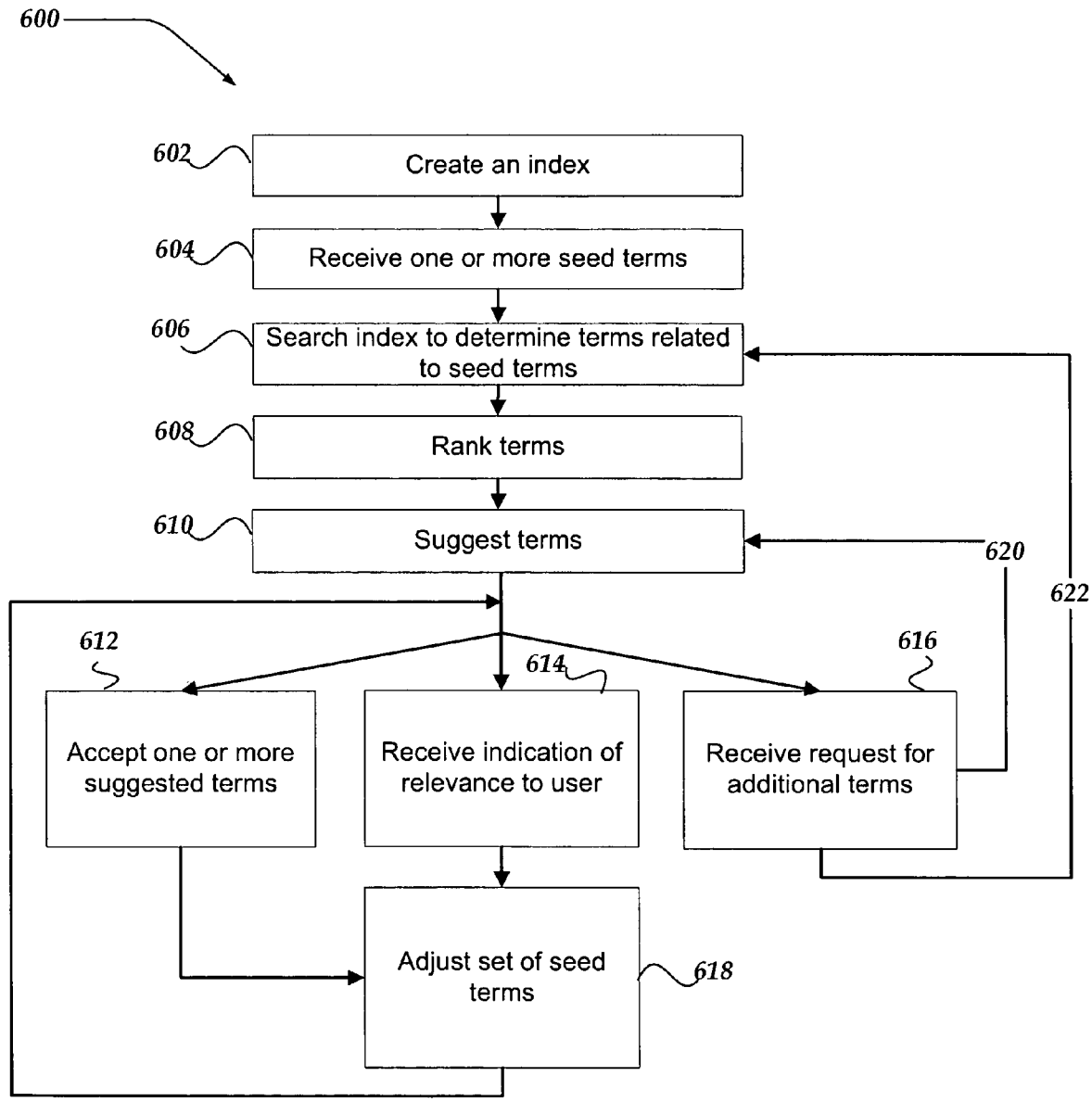
FIG. 6 is a flow chart of one embodiment of a method for discovering semantically related terms based on search engine logs.

In addition to determining semantically related terms based on advertisement data from an advertisement campaign management system, an advertisement campaign management system may determine semantically related terms based on search engine logs. FIG. 6 is a flow chart of one embodiment of a method for discovering semantically related terms based on search engine logs. Generally, an advertisement campaign management system creates one or more indexes based at least in part on search engine logs. A search engine log may include information such as terms entered at a search engine by a user, the URLs that are displayed in search results in response to each term, the order that the URLs appear in when displayed to a user, the URLs that a user clicked on when using a term, and the number of times a user clicked on each URL.

In one implementation, the advertisement campaign management system creates one index based on the search engine logs. However, in other implementations the index may be expanded into any number of indexes. The advertisement campaign management system creates an index that associates for each term in the search logs, all of the other terms in the search logs which resulted in a searcher clicking on a URL that the same or different searcher also clicked on when searching a second term. In other words, the index establishes a relationship between a first term and a second term if at some point in the search logs, a search for the first term and a search for the second term both resulted in the same or different searcher clicking on the same URL.

After the index is created, the advertisement campaign management system may receive one or more seed terms. As described above, each seed term may be a positive seed term or a negative seed term, and each seed term may be a single word or a phrase. The advertisement campaign management system uses the index to determine a plurality of potential terms that resulted in a searcher clicking on a URL which the same or different searcher also clicked on when searching for the seed terms. At least a portion of the plurality of potential terms is suggested to the advertiser and the advertisement campaign management system receives an indication from the advertiser regarding the relevance of one or more suggested terms to the advertiser. The advertisement campaign management system may adjust the set of seed terms to incorporate one or more of the suggested terms to create a new set of seed terms. The advertisement campaign management system then repeats the above process using the new set of seed terms to determine a new set of potential terms. It will be appreciated that the advertisement campaign management system may repeat this process any number of times as requested by the advertiser.

The method 600 begins with the advertisement campaign management system creating one or more indexes 602 based on the search logs of an internet advertisement service provider or an internet search engine. In one embodiment, the advertisement campaign management system creates an index that relates terms from the search logs that resulted in the same or different searcher clicking on the same URL.

The advertisement campaign management system receives one or more seed terms from a user such as an advertiser 604. As discussed above, each of the seed terms may be a single word or a phrase. Additionally, each of the seed terms may be a positive seed term indicating a type of term the user would like to receive semantically related words to or be a negative seed term indicating a type of term the user would like to avoid.

The advertisement campaign management system uses the index to determine a plurality of potential terms that resulted in a searcher clicking on the same URL that the same or different searcher clicked on when searching for the seed terms 606.

In one embodiment, the advertisement campaign management system first assigns a score to each term relating to the term's association with one of the seed terms as evidenced by the search engine logs. The advertisement campaign management system then totals the scores of each term relating to each of the seed terms. The advertisement campaign management system examines the total score of each term, and based on the terms having the highest score, determines a plurality of potential terms that is most relevant to the seed terms.

The advertisement campaign management system ranks the potential terms 608 based on the determined score, and suggests at least a portion of the potential terms to the advertiser 610. A user may then choose to accept one or more of the suggested terms 612, send an indication to the advertisement campaign management system regarding the relevance of one or more suggested terms to the advertiser 614, and/or request additional suggested terms 616.

If the user accepts one or more of the suggested terms 612 and/or sends an indication to the advertisement campaign management system regarding the relevance of one or more suggested terms to the advertiser 614, the advertisement campaign management system adjusts the set of seed terms 618. The advertisement campaign management system may adjust the set of seed terms by including one or more terms that the advertiser has accepted or by including one more terms that the advertiser has indicated the relevance of. With respect to suggested terms the advertiser has indicated the relevance of, the advertisement campaign management system may add one or more terms that the advertiser has indicated are relevant to the advertiser as positive seed terms and/or add one or more terms that the advertiser has indicated are not relevant to the advertiser as negative seed terms. Further, the advertisement campaign management system may adjust the set of seed terms by removing any seed terms currently in the set of seed terms or ensuring that certain seed terms such as negative seed terms remain in the set of seed terms.

In one implementation, the advertisement campaign management system maintains a set of seed terms including a predetermined maximum number of seed terms such as fifty. When the advertisement campaign management system adjusts the set of seed terms, the advertisement campaign management system maintains any negative seed terms. Further, the advertisement campaign management system includes one or more terms the advertiser has indicated are not relevant to the advertiser as negative seed terms. Additionally, the advertisement campaign management system includes one or more terms the advertiser has indicated are relevant to the advertiser as positive seed terms. If after adding the new positive and negative seed terms to the set of seed terms, the number of seed terms in the set of seed terms is more than the predetermined maximum number of seed terms, the advertisement campaign management system may remove seed terms from the set of seed terms. Therefore, after adjusting the set of seed terms, the set of seed terms may or may not include any of the seed terms the advertiser originally sent to the advertisement campaign management system.

If the user requests additional suggested terms 616 and advertisement campaign management system did not adjust the seed terms, the advertisement campaign management system loops 620 to step 610 and may present additional potential terms as determined in step 608.

If the user requests additional suggested terms 616 and the advertisement campaign management system has adjusted the seed terms 618, the advertisement campaign management system loops 622 to step 606 and the above-described process is repeated. At step 606, the advertisement campaign management system uses the index to determine a plurality of potential terms that resulted in a searcher clicking on the same URL that the same or different searcher clicked on when searching for the new set of seed terms.

The user may continue to choose whether to accept one or more of the suggested terms 612, send an indication to the advertisement campaign management system regarding the relevance of one or more of the suggested terms to the advertiser 614, and/or request additional suggested terms 616 until the user instructs the advertisement campaign management system to stop suggesting terms.

Similar to the method of FIG. 4, the advertisement service provider may calculate continuous degrees of relevance between each term in the search logs based on all users who complete the method of FIG. 6. Calculating a continuous degree of relevance of relevance between terms in the search logs allows the advertisement campaign management system to build an index that includes reliable degrees of relevance for accurately suggesting semantically related terms to users.

To build the index, each time the advertisement campaign management system suggests a set of terms and receives an indication of relevance to the advertiser, the advertisement campaign management system may reweigh a degree of relevance terms in the search logs. For example, if an advertiser indicates a suggested term is relevant to the advertiser, the advertisement campaign management system may increase a degree of relevance to the seed term of at least one term where at some point in the search logs, searches for the relevant suggested term, the seed terms, and the term resulted in the same or different searcher clicking on the same URL. In contrast, if an advertiser indicates a suggested term is not relevant to the seed terms, the advertisement campaign management system may decrease the degree of relevance to the seed terms of all terms where at some point in the search logs, searches for the irrelevant suggested term, the seed terms, and the term resulted in the same or different searcher clicking on the same URL. In one embodiment, the advertiser may simply indicate that a suggested term is relevant to the advertiser or not relevant to the advertiser. However in other embodiments, the advertiser may indicate that a suggested term is relevant to the advertiser or not relevant to the advertiser on a scale, such as 1 to 10.

In addition to building an index including reliable degrees of relevance between terms in a search engine log based on interactions with users, the advertisement campaign management system may use supervised machine learning algorithms or function learning algorithms to develop an index after the index is initially built according to the method of FIG. 6 based on the search engine logs. The advertisement campaign management system may run the supervised machine learning algorithm or function learning algorithm on an index that has been at least partially built by users to predict a degree of relevance between the terms in the search logs based on data from the search engine logs. Generally, the advertisement campaign management system may begin using the supervised machine learning algorithm or function learning algorithm to further develop the index at any point after minimal associations have been established in the index relating different terms in the search logs. However, the more developed the index is before the advertisement campaign management system applies the supervised machine learning algorithm or the function learning algorithm, the more accurate the supervised machine learning algorithm or function learning algorithm will be in predicting degrees of relevance between terms.

In one embodiment, the machine learning algorithm or function learning algorithm learns a function based on how closely a potential term relates to the seed terms in the search engine logs as evidence by the number of seed terms associated with the potential term by a webpage; how prominently the potential term appears in the search engine logs as evidence by the average rank, weighted by click frequency, of the clicks on a URL associated with a potential term; how often the potential term leads to any webpage based on the total click frequency of a potential term; the specificity of a term evidenced by the number of distinct webpages a searcher clicked on after searching the term; the specificity of a term as evidenced by a number of clicks on a linked term; the specificity of a webpage as evidenced by the number of terms associated with the webpage; the lexical similarity of potential terms and the seed terms as evidenced by the Levenhstein distance, average edit distance or average word edit distance of the seed terms from a potential term; any special characters such as numbers or domain names associated with a potential term; and the relationships between potential terms that are stems of other potential terms.

Figure 7:
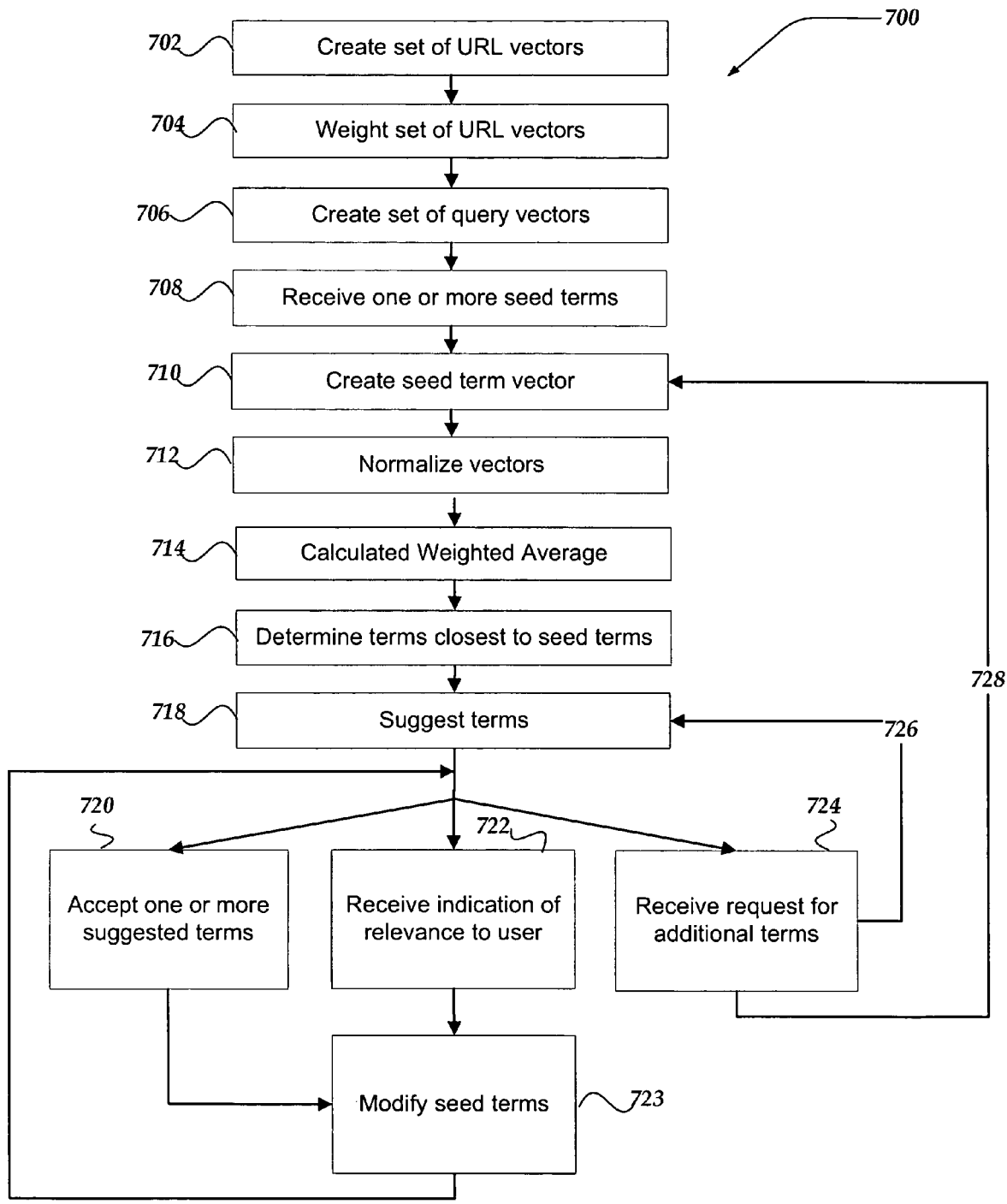
FIG. 7 is a flow chart of another embodiment of a method for discovering semantically related terms based on search engine logs.

FIG. 7 is a flow chart of another embodiment of a method for discovering semantically related terms based on search engine logs. Generally, an advertisement campaign management system creates one or more vectors based at least in part on search engine logs. A search engine log may include one or more terms entered by a user at an Internet search engine, the URLs that are displayed in response to a term, the order that the URLs are displayed in search listings in response to a term, the URLs that a user clicked on when using a term, and the number of times a user clicked on a URL when using a term. In one embodiment, the advertisement campaign management system creates a set of URL vectors associating for each URL in the search log, a number of times a user searched for each term in the search log and clicked on the relevant URL. The advertisement campaign management system then determines a plurality of suggested terms based on one or more seed terms and the set of URL vectors.

The method 700 begins with an advertisement campaign management system creating a set of URL vectors based on the search logs 702. The set of URL vectors associates for each URL in the search log, a number of times a user searched for each search term in the search logs and clicked on the relevant URL. In one embodiment, the advertisement campaign management system weighs each term in the set of URL vectors 704 based on factors such as how frequently a user searched for the term and clicked on a URL. In one implementation, the advertisement campaign management system weights each term in the set of URL vectors so that webpages that were clicked on more frequently are weighted less than webpages that were clicked on less frequently. For example, each entry in the set of URL vectors may be weighed by multiplying the entry by the logarithm of the quantity of the total number of distinct URLs in the search log over the number of distinct URLs in the search log associated with the term of the entry.

The advertisement campaign management system additional creates a set of query vectors based on the search logs 706. The set of query vectors associates for each URL in the search log, whether a user searched for each term in the search log and clicked on the URL. In one implementation, each entry in the set of query vectors will include a positive non-zero number if the search logs evidence a user searched for a term and clicked on the relevant URL and will include the number zero if a searcher did not search for a term and click on the relevant URL.

After creating the set of URL vectors and the set of query vectors, the advertisement campaign management system receives one or more seed terms from a user such as an advertiser 708. As discussed above, each of the seed terms may be a single word or a phrase. Additionally, each seed term may be a positive seed term or a negative seed term. The campaign advertisement management system creates a seed term vector based on the received seed terms 710. In one implementation, the seed term vector includes a value for each term in the search logs, where the value of the entry is a positive non-zero number if the term is a positive seed terms, the value of the entry is a negative non-zero number if the term is a negative seed terms, and the value of the entry is zero if the term is not a seed term.

Typically, the set of URL vectors, set of query vectors, and seed term vectors are each normalized 712 so that the magnitude of each vector is one. The advertisement campaign management system then calculates a weighted average 714 over a number URLs in the search logs as a function of the set of URL vectors, set of query vectors, and seed term vector 710 to determine the terms that are closest to the seed terms. In one implementation, the weighted average may be calculated over every URL in the search log. However, in other embodiments, the weighted average may be calculated over a predetermined number of URLs in the search logs that are closest to the seed terms as determined by the advertisement campaign management system.

In one embodiment, the weighted average is calculated using the function:

$$T = \text{Sum of } (V1 * \text{cosine}(V2, S)),$$

wherein $V1*\text{cosine}(V2,S)$ is calculated for each URL in the search log; V1 is the relevant query vector indicating for each term in the search log, whether a user searched for a term and clicked on the relevant URL; V2 is the relevant URL vector indicating for each term in the search logs, a number of times a user searched for the term and clicked on the relevant URL; and S is the seed term vector indicating for each term in the search log, whether the term is one of the seed terms received by a user. As discussed above, the sum of ($V1*\text{cosine}(V2,S)$) may be calculated for all URLs in the search logs or the sum of ($V1*\text{cosine}(V2,S)$) may be calculated for a number of URLs that is less than the total number of URLs in the search logs.

After calculating the sum of ($V1*\text{cosine}(V2,S)$), T will comprise a vector having a value for each term in the search logs. The advertisement campaign management system examines the resulting vector T to determine the terms having the highest value in the resulting vector T after the weighted average 716. In one embodiment, the advertisement campaign management system may determine the top ten terms having the highest value in the resulting vector T after the weighted average, but the advertisement campaign management system may determine any number of top terms. The advertisement campaign management system then suggests at least a portion of the terms having the highest value in the resulting vector T to the user 718.

After receiving the terms, the advertiser may accept one or more of the suggested terms 720, indicate a degree of relevance of the one or more suggested terms to the advertiser 722, and/or request additional suggested terms 724.

If the user accepts one or more of the suggested terms 720 or sends an indication to the advertisement campaign management system regarding the relevance of one or more suggested terms to the advertiser 722, the advertisement campaign management system adjusts the set of seed terms 723 as discussed above.

If the user requests additional suggested terms 724 and the advertisement campaign management system has not adjusted the set of seed terms, the advertisement campaign management system loops 726 to step 718 and may present additional potential terms as determined in step 716.

If the user requests additional suggested terms 724 and the advertisement campaign management system has adjusted the set of seed terms 723, the advertisement campaign management system loops 728 to step 710. At step 710, the advertisement campaign management system creates a seed term vector based on the new set of seed terms and the above-described process is repeated.

The user may continue to choose whether to accept one or more of the suggested terms 720, indicate a degree of relevance of the one or more suggested terms to the advertiser 722, and/or request additional suggested terms 724 until the user instructs the advertisement campaign management system to stop suggesting terms.

It should be appreciated that while each of the methods of FIGS. 4-7 have been described as separate method, in some embodiments it may be possible to string the method of FIGS. 4-7 together. For example, an advertisement campaign management system may receive a set of seed terms and use the method of FIG. 4 for a first iteration to suggest one or more semantically related terms. After a user indicates a degree of relevance of the suggested terms to the seed terms, if the user requests additional suggested search terms, the advertisement campaign management system may use the relevant suggested terms as seed terms in the method of FIG. 6 for a second iteration to suggest one or more semantically related terms. In other words, the methods of FIGS. 4-7 may be placed end-to-end in any order such that an advertisement campaign management system may use the suggested terms obtained using one method to determine semantically related terms as the seed terms for another method to determine semantically related terms.

Further, while the methods of FIG. 4-7 have been described with a user supplying a set of seed terms, it will be appreciated that an advertisement campaign management system may also automatically create a set of seed terms for a user. For example, in one embodiment, a user may supply an online advertising account number to the advertisement campaign management system. In response, the advertisement campaign management system determines based on advertisement campaign information in the supplied account, what terms an advertiser has previously, or is currently, bidding on. The advertisement campaign management system then uses the determined terms as seed terms in the methods described above with respect to FIGS. 4-7.

Figure 8:
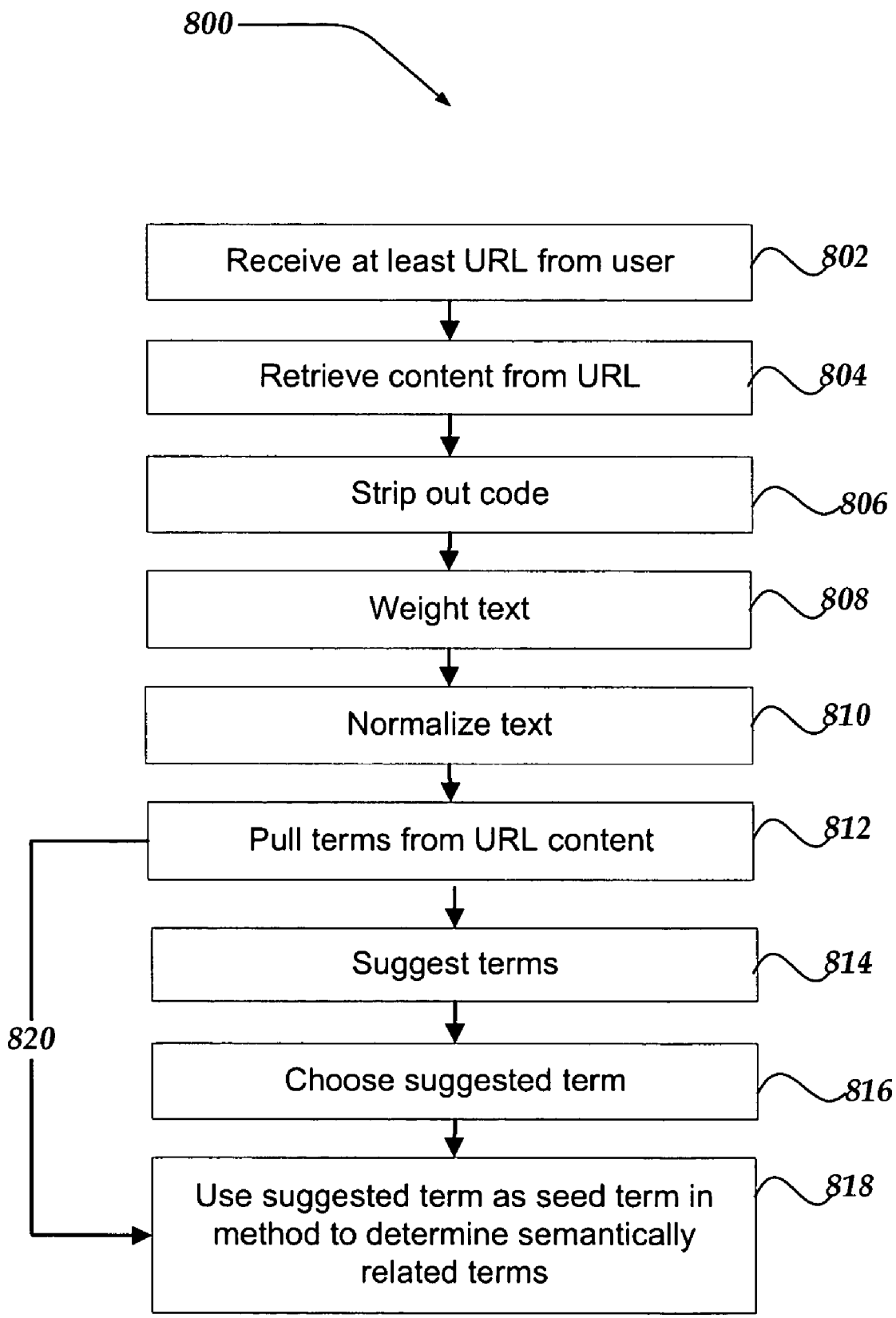
FIG. 8 is a flow chart of an embodiment of a method for discovering a set of seed terms for suggesting semantically related terms.

An advertisement campaign management system may additionally determine seed terms from the content of a webpage. FIG. 8 is a flow chart of an embodiment of a method for discovering a set of seed terms for suggesting semantically related terms. In contrast to the method described above with respect to FIG. 4-7 where an advertiser sends only one or more seed terms to an advertisement campaign management system, in the method of FIG. 8, an advertiser sends a URL of a webpage to an advertisement campaign management system in place of, or in addition to, one or more seed terms. The advertisement campaign management system then determines one or more seed terms for an advertiser based on the webpage content. The advertisement campaign management system may additionally suggest the determined seed terms themselves as terms to the user.

Generally, the advertisement campaign management system receives at least a URL address from an advertiser and determines one or more seed terms from webpage content at the URL address. The advertisement campaign management system may suggest the one or more seed terms as terms to an advertiser or the advertisement campaign management system may use the seed terms in one of the methods for determining semantically related terms described above. The method 800 begins with an advertisement campaign management system receiving a URL address from a user 802. In response to receiving the URL address, the advertisement campaign system retrieves the content of the URL 804 and strips out any code from the webpage content 806. In one embodiment, the advertisement campaign management system may strip out HTML code, Java script, style sheets, or any other type of code other than the text of the URL content.

The advertisement campaign management system associates different weights for each term in the URL content 808. In one embodiment, the advertisement campaign management system may associate a weight with a term based on factors such as where the term was located on a webpage, how frequently the term appears on the webpage, whether a term is a multi-word term, or based on a ratio of the number of words in a term to the number of words in a text segment in the webpage content where the term came from. For example, with respect to location on a webpage, the advertisement campaign management system may assign a greater weight to a term that is located in a heading of a webpage rather than a term that is located in a body of a webpage. With respect to frequency, the advertisement campaign management system may weight a term that appears multiple times on a webpage higher than a term that appears once on a webpage.

The advertisement campaign management system normalizes the text from the webpage 810. In one embodiment, the advertisement campaign management system normalizes the text by performing actions such as removing functional words that do not affect the meaning of a term, changing the order of any multiple-word term, paraphrasing a term, stemming a term, changing whether a terms is plural or singular, changing or removing punctuation in the term, or any other function to normalize a term as known in the art.

After weighting 808 and normalizing 810 the webpage content, the advertisement campaign management system pulls terms from the text of URL content having a highest weight 812. In one implementation, the advertisement campaign management system may pull the top ten terms having a highest weight, but in other embodiments the advertisement campaign management system may pull any number of terms from the webpage content.

In one embodiment, the advertisement campaign management system suggests at least a portion of the terms pulled from the URL content to a user 814 and allows the user to choose whether to use the suggested terms 816 and/or to use the suggested terms as seed terms 818 in a method to determine semantically related terms such as those described above with respect to FIGS. 4-7. However, in other embodiments, the advertisement campaign management system may automatically 820 use the terms as seed terms 814 in a method to determine semantically related terms such as those described above with respect to FIGS. 4-7.

The above disclosure describes systems and methods for discovering semantically related terms based on advertisement data of advertisement campaign management systems, search logs of internet search engines, and the content of actual webpages. It should be appreciated that while the above methods and systems describe discovering semantically related words for purposes of bidding on online advertisements, these same methods and systems could be used to assist a searcher performing research at an internet search engine. For example, a searcher may send one or more terms to a search engine. The search engine may use the terms as seed terms and suggest semantically related words related to the terms either with the search results generated in response to the terms, or independent of any search results. Providing the searcher with semantically related terms allows the searcher to broaden or focus any future searches so that the search engine provides more relevant search results to the searcher.

Further, it should be appreciated that an online advertisement service provider may use the disclosed methods and systems in a campaign optimizer component 275 (FIG. 2) as described above or to determine semantically related terms to match advertisements to terms received from a search engine. Using semantically related terms allows an online advertisement service provider to serve an advertisement if the term that an advertiser bid on is semantically related to a term sent to a search engine rather than only serving an advertisement when a term sent to a search engine exactly matches a term that an advertiser has bid on. Providing the ability to serve an advertisement based on semantically related terms when authorized by an advertiser provides increased relevance and efficiency to an advertiser so that an advertiser does not have to determine every possible word combination where the advertiser would like their advertisement served to a potential customer.

Additionally, it should be appreciated that while the above methods and systems describe determining semantically related terms based on information related to websites, the same methods and systems could be used to determine semantically related terms based on information related to a combination of websites and/or ad groups. As described above, an ad group is a group of advertisements defined by a user that will be handled by an advertisement campaign management system in a similar manner. For example, users may group advertisements by a search tactic, performance parameter, demographic of a user, family of products, or almost any other parameter desired by the user. Allowing users to define their own ad groups allows the advertisement campaign management system to provide more useful information in a manner most relevant to the user.

It is therefore intended that the foregoing detailed description be regarded as illustrative rather than limiting, and that it be understood that it is the following claims, including all equivalents, that are intended to define the spirit and scope of this invention.

The invention claimed is:

1. A method for determining semantically related terms, comprising:
   receiving one or more seed terms;
   searching a first index to determine a plurality of webpages associated with the seed terms, the first index comprising a plurality of terms and for each term of the plurality of terms, an association between one or more webpages and the term;
   searching a second index to determine a plurality of potential terms associated with the plurality of webpages associated with the seed terms, the second index comprising a plurality of identifiers for webpages and for each webpages of the plurality of identifiers for webpages, an association between one or more terms and the webpage;
   sending at least one term of the plurality of potential terms to a user to suggest the at least one term of the plurality of potential terms to the user;
   receiving an indication of relevance of at least one suggested term to the user;
   modifying with a processor the terms which comprise the seed terms based at least in part on the received indication of relevance;
   receiving an indication that a first term is relevant to the user; and
   modifying with a processor the seed terms to comprise the first term as a positive seed term;
   wherein receiving one or more seed terms comprises;
      receiving a location of a webpage
         retrieving with a processor the content of the webpage from the location of the webpage;
         stripping code from the content of the webpage with a processor;
         pulling one or more terms from the content of the webpage; and
         weighing each term of the one or more terms pulled form the content of the webpage with a processor based on a location of where the term was located on the webpage.

2. The method of claim 1, wherein the indication of relevance to the user is an indication of relevance to the user on a scale.

3. The method of claim 1, wherein modifying the terms which comprise the seed terms comprises:
   receiving an indication that a second term is not relevant to the user; and
   modifying the seed terms to comprise the second term as a negative seed term.

4. The method of claim 1, further comprising:
   searching the first index to determine a second plurality of webpages associated with the modified seed terms;
   searching the second index to determine a second plurality of potential terms associated with the second plurality of webpages associated with the modified seed terms; and
   suggesting at least one term of the second plurality of potential terms.

5. The method of claim 1, further comprising:
   calculating a continuous degree of relevance based on indications of relevance of a term to a user received from a plurality of users.

6. The method of claim 1, wherein the first and second indexes are the same index.

7. The method of claim 1, wherein the first and second indexes are different indexes.

8. The method of claim 1, further comprising:
   suggesting at least one term of the terms pulled from the content of the webpage.

9. The method of claim 1, wherein the one or more seed terms comprise at least one term sent to an internet search engine.

10. A computer-readable storage medium comprising a set of instructions for determining semantically related terms, the set of instructions to direct a processor to perform acts of:
    receiving one or more seed terms;
    searching a first index to determine a plurality of webpages associated with the seed terms, the first index comprising a plurality of terms and for each term of the plurality of terms, an association between one or more webpages and the term;
    searching a second index to determine a plurality of potential terms associated with the plurality of webpages associated with the seed terms, the second index comprising a plurality of identifiers for webpages and for each webpages of the plurality of identifiers for webpages, an association between one or more terms and the webpage;
    sending at least one term of the plurality of potential terms to a user to suggest the at least one term of the plurality of potential terms to the user;
    receiving an indication of relevance of at least one suggested term to the user;
    modifying the terms which comprise the seed terms based at least in part on the received indication of relevance;
    receiving an indication that a second term is not relevant to the user; and modifying the seed terms to comprise the second term as a negative seed term;
    wherein receiving one or more seed terms comprises:
       receiving a location of a webpage
          retrieving the content of the webpage from the location of the webpage:
          stripping code from the content of the webpage;
          pulling one or more terms from the content of the webpage; and
          weighing each term of the one or more terms pulled form the content of the webpage based on a location of where the term was located on the webpage.

11. The computer-readable storage medium of claim 10, further comprising a set of instructions to direct a processor to perform acts of:
    searching the first index to determine a second plurality of webpages associated with the modified seed terms;
    searching the second index to determine a second plurality of potential terms associated with the second plurality of webpages associated with the modified seed terms; and
    suggesting at least one term of the second plurality of potential terms.

12. The computer-readable storage medium of claim 11, wherein the one or more seed terms comprise at least one term sent to an internet search engine.

13. A system for determining semantically related terms comprising:
    one or more database servers comprising at least one memory module storing a first database comprising first index and a second database comprising a second index, wherein the first index comprises a plurality of terms and for each term of the plurality of terms, an association between one or more webpages and the term and wherein the second index comprises a plurality of identifiers for webpages and for each webpage of the plurality of identifiers for webpages, an association between one or more terms and the website; and a keyword suggestion module running in conjunction with at least one processor of at least one server, the keyword suggestion module operative to access the first and second indexes stored at the one or more database servers, the keyword suggestion module configured to:

receive one or more seed terms;

search the first index to determine a plurality of webpages associated with the seed terms;

search the second index to determine a plurality of potential terms associated with the plurality of webpages;

send at least one of the plurality of potential terms to a user to suggest the at least one of the plurality of potential terms to the user;

receive an indication of relevance of at least one suggested term to a user;

modify the terms which comprise the seed terms based at least in part on the received indication of relevance;

receive an indication that a first term is relevant to the user; and modify the seed terms to comprise the first term as a positive seed term;

wherein to receive one or more seed terms, the keyword suggestion module is further configured to:

receive a location of a webpage;

retrieve content of the webpage from the location of the webpage;

strip code from the content of the webpage;

pull one or more terms from the content of the webpage; and weigh each term of the one or more terms pulled from the content of the webpage based on a location of where the term was located on the webpage.

14. The system of claim 13, wherein the first and second database are the same database.

15. The method of claim 13, wherein the one or more seed terms comprise at least one term sent to an internet search engine.

16. A method for determining semantically related terms, comprising:

receiving one or more seed terms;

determining with a processor one or more potential terms semantically related to seed terms based on one or more vectors comprising entries regarding a plurality of webpages at an advertisement campaign managements, terms associated with each webpage of the plurality of webpages, and a number of terms associated with each webpage of the plurality of webpages; and sending with a processor at least a portion of the determined potential terms to a user to suggest the portion of the determined potential terms to the user;

wherein determining one or more potential terms semantically related to seed terms based on one or more vectors comprises:

creating a first set of vectors representing for each webpage at an advertisement campaign management system, whether a term at the advertisement campaign management system is associated with the webpage;

creating a second set of vectors representing for each webpage at the advertisement campaign management system, at least a weight of each term associated with the webpage; and determining one or more potential terms semantically related to the seed terms based on the first and second sets of vectors, and the seed terms; and wherein determining one or more potential terms semantically related to the seed terms based on the first and second sets of vectors, and the seed terms comprises:

calculating the equation:

$$T = \text{Sum of } (V1 * \text{cosine}(V2, S)).$$

wherein $V1*\text{cosine}(V2,S)$ is calculated for a number of webpages at the advertisement campaign management system; V1 is the vector of the first set of vectors indicating for each term at the advertisement campaign management system, whether a term is associated with the webpage; V2 is the vector of the second set of vectors including for each term at the advertisement campaign management system, an entry indicating a weight of a term associated with the webpage; S is a seed term vector indicating for each term at the advertisement campaign management system, whether the term is a seed term; and T is a vector indicating for each term at the advertisement campaign management system, how relevant the term is to the seed terms.

17. The method of claim 16, wherein determining one or more potential terms semantically related to the seed terms based on one or more vectors further comprises:

normalizing at least one vector of the second set of vectors.

18. The method of claim 16, wherein the number of webpages is every webpage at the advertisement campaign management system.

19. A computer-readable storage medium comprising a set of instructions for determining semantically related terms, the set of instructions to direct a processor to perform acts of:

receiving one or more seed terms;

determining one or more potential terms semantically related to seed terms based on one or more vectors comprising entries regarding a plurality of webpages at an advertisement campaign managements, terms associated with each webpage of the plurality of webpages, and a number of terms associated with each webpage of the plurality of webpages; and sending at least a portion of the determined potential terms to a user to suggest the portion of the determined potential terms to the us;

wherein determining one or more potential terms semantically related to seed terms based on one or more vectors comprises:

creating a first set of vectors representing for each webpage at an advertisement campaign management system, whether a term at the advertisement campaign management system is associated with the webpage;

creating a second set of vectors representing for each webpage at the advertisement campaign management system, at least a weight of each term associated with the webpage; and determining one or more potential terms semantically related to the seed terms based on the first and second sets of vectors, and the seed terms; and wherein determining one or more potential terms semantically related to the seed terms based on the first and second sets of vectors, and the seed terms comprises: calculating the equation:

$$T = \text{Sum of } (V1 * \text{cosine}(V2, S)).$$

wherein V1*cosine(V2,S) is calculated for a number of webpages at the advertisement campaign management system; V1 is the vector of the first set of vectors indicating for each term at the advertisement campaign management system, whether a term is associated with the webpage; V2 is the vector of the second set of vectors including for each term at the advertisement campaign management system, an entry indicating a weight of a term associated with the webpage; S is a seed term vector indicating for each term at the advertisement campaign management system, whether the term is a seed term; and T is a vector indicating for each term at the advertisement campaign management system, how relevant the term is to the seed terms.

20. The computer-readable storage medium of claim 19, wherein determining one or more potential terms semantically related to the seed terms based on one or more vectors further comprises:

normalizing at least one vector of the second set of vectors.

21. The computer-readable storage medium of claim 19, wherein the number of webpages is every webpage at the advertisement campaign management system.

22. The computer-readable storage medium of claim 19, wherein the portion of the determined potential terms is sent to the user via a user interface of an advertisement campaign management system.

23. The computer-readable storage medium of claims 19, wherein the portion of the determined potential terms is sent to the user via an application program interface ("API") of an advertisement campaign management system.

* * * * *